(12) United States Patent
Chen et al.

(10) Patent No.: US 9,765,926 B2
(45) Date of Patent: Sep. 19, 2017

(54) SYSTEMS AND METHODS FOR PAYLOAD STABILIZATION

(71) Applicant: SZ DJI TECHNOLOGY Co., Ltd, Shenzhen (CN)

(72) Inventors: Fazhan Chen, Shenzhen (CN); Zihan Chen, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 81 days.

(21) Appl. No.: 14/681,830

(22) Filed: Apr. 8, 2015

(65) Prior Publication Data

US 2016/0033077 A1 Feb. 4, 2016

Related U.S. Application Data

(63) Continuation of application No. 14/472,023, filed on Aug. 28, 2014, now Pat. No. 9,030,149, which is a continuation of application No. PCT/CN2014/083265, filed on Jul. 29, 2014.

(51) Int. Cl.
| | |
|---|---|
| G05D 1/08 | (2006.01) |
| F16M 13/04 | (2006.01) |
| A45F 5/10 | (2006.01) |
| B64D 47/08 | (2006.01) |
| F16M 11/12 | (2006.01) |
| F16M 11/18 | (2006.01) |
| F16M 11/42 | (2006.01) |
| F16M 11/04 | (2006.01) |

(52) U.S. Cl.
CPC ............... *F16M 13/04* (2013.01); *A45F 5/10* (2013.01); *B64D 47/08* (2013.01); *F16M 11/04* (2013.01); *F16M 11/123* (2013.01); *F16M 11/18* (2013.01); *F16M 11/42* (2013.01); *B64C 2201/127* (2013.01)

(58) Field of Classification Search
CPC ..... G05B 19/19; G03B 17/425; G03B 17/563
USPC ........................................................ 318/585
See application file for complete search history.

(56) References Cited

U.S. PATENT DOCUMENTS 4,017,168 A * 4/1977 Brown ................... F16M 11/10
                                                              248/586
4,387,513 A    6/1983 Cowdin
(Continued)

FOREIGN PATENT DOCUMENTS

CN       202295294 U    7/2012
CN       202769211 U    3/2013
(Continued)

OTHER PUBLICATIONS

International search report and written opinion dated May 6, 2015 for PCT/CN2014/083265.

(Continued)

*Primary Examiner* — Bickey Dhakal
(74) *Attorney, Agent, or Firm* — Wilson Sonsini Goodrich & Rosati

(57) ABSTRACT

Systems and methods are provided for supporting and articulating a payload using stabilization platform. The stabilization platform may be configured to avoid gimbal lock. The stabilization platform may be configured to automatically transition between different modes of orientation.

20 Claims, 19 Drawing Sheets

(56) References Cited

U.S. PATENT DOCUMENTS

| | | | |
|---|---|---|---|
| 5,062,755 A * | 11/1991 | Lawrence | B25J 13/088 414/4 |
| 5,243,370 A * | 9/1993 | Slater | F16M 13/04 248/123.2 |
| 5,963,749 A | 10/1999 | Nicholson | |
| 6,611,662 B1 | 8/2003 | Grober | |
| 7,000,883 B2 | 2/2006 | Mercadal et al. | |
| 7,642,741 B2 | 1/2010 | Sidman | |
| 8,179,078 B2 | 5/2012 | Sidman | |
| 8,861,947 B2 * | 10/2014 | Webb | H04N 5/2328 396/421 |
| 9,030,149 B1 | 5/2015 | Chen et al. | |
| 9,574,703 B2 * | 2/2017 | Firchau | F16M 11/041 |
| 2006/0108964 A1 | 5/2006 | Shibatani | |
| 2007/0050139 A1 | 3/2007 | Sidman | |
| 2009/0207250 A1 | 8/2009 | Bennett et al. | |
| 2010/0079101 A1 * | 4/2010 | Sidman | F16M 11/041 318/649 |
| 2012/0049035 A1 | 3/2012 | Black et al. | |
| 2014/0267778 A1 | 9/2014 | Webb et al. | |
| 2014/0267805 A1 | 9/2014 | Webb | |
| 2014/0267810 A1 | 9/2014 | Webb et al. | |
| 2014/0270743 A1 | 9/2014 | Webb et al. | |
| 2014/0270744 A1 | 9/2014 | Webb et al. | |

FOREIGN PATENT DOCUMENTS

| | | |
|---|---|---|
| CN | 103672340 A | 3/2014 |
| CN | 203594946 U | 5/2014 |
| CN | 103926940 A | 7/2014 |
| WO | WO 2010/033096 A1 | 3/2010 |
| WO | WO 2014/140354 A1 | 9/2014 |
| WO | WO 2014/140355 A1 | 9/2014 |
| WO | WO 2014/140356 A1 | 9/2014 |
| WO | WO 2014/140357 A1 | 9/2014 |
| WO | WO-2016015232 A1 | 2/2016 |

OTHER PUBLICATIONS

U.S. Appl. No. 14/472,023, filed Aug. 28, 2014, Chen et al.
Notice of allowance dated Mar. 13, 2015 for U.S. Appl. No. 14/472,023.
Office action dated Dec. 15, 2014 for U.S. Appl. No. 14/472,023.
European search report and search opinion dated Jun. 29, 2017 for EP Application No. 14898638.3.

* cited by examiner

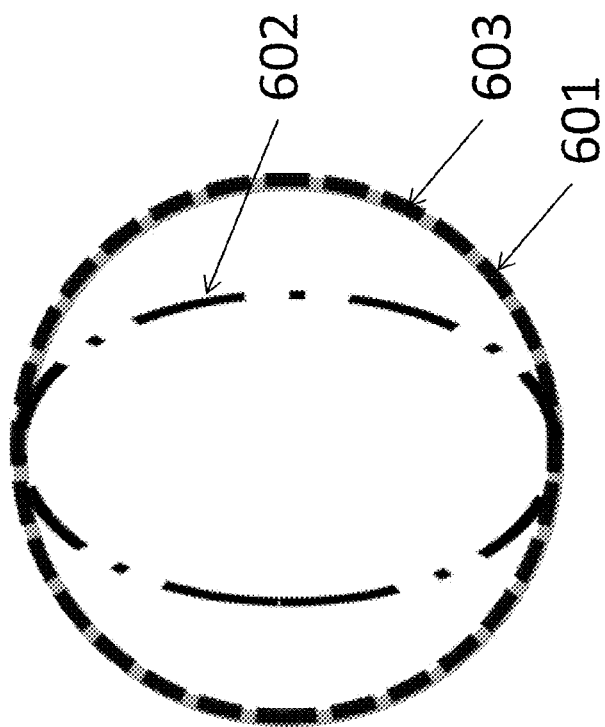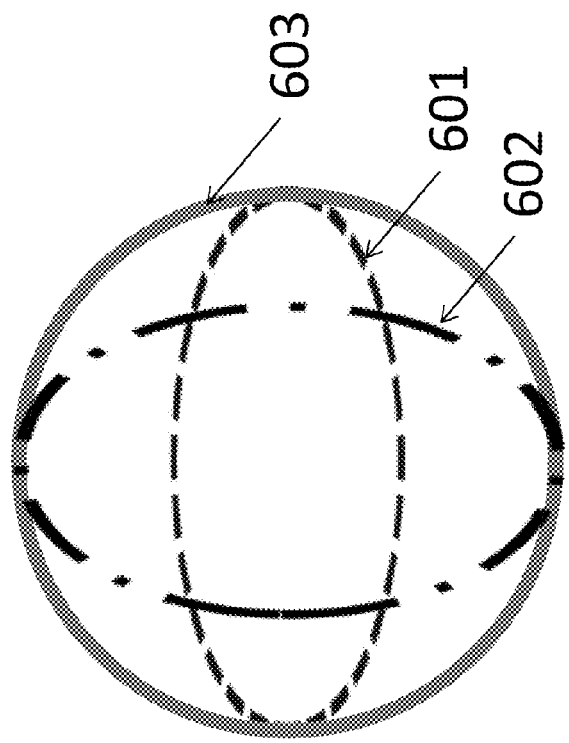
FIG. 6

SYSTEMS AND METHODS FOR PAYLOAD STABILIZATION

CROSS-REFERENCE

This application is a continuation application of U.S. patent application Ser. No. 14/472,023, filed on Aug. 28, 2014, which is a continuation application of International Application No. PCT/CN2014/083265, filed on Jul. 29, 2014, the contents of which are hereby incorporated by reference in their entirety.

BACKGROUND OF THE INVENTION

Payloads including sensors, cargo, passengers, and devices may require stabilization and movement in three dimensions. For example, a camera may require stabilization while shooting still photographs or video. Three dimensional articulation may be achieved using a multi-dimensional gimbal. The multidimensional gimbal may be supported by a frame.

Multidimensional gimbals may be susceptible to gimbal lock. This may cause deterioration in control of the gimbal system and reduce reliability of control of a payload.

SUMMARY OF THE INVENTION

Multidimensional gimbal systems may be used to stabilize a payload in a coordinate system. Multidimensional gimbal systems may encounter situations wherein one or more axes are rotated such that they overlap, the overlap may result in a condition known as gimbal lock. Gimbal lock may deteriorate control of the gimbal system. A need exists to stabilize a payload in a multidimensional gimbal system while avoiding gimbal lock. Additionally it may be desirable to change the orientation of the frame holding a payload without causing a significant disturbance in the payload orientation. Furthermore it may be advantageous to stabilize the payload in a system that may achieve multiple configurations such that the stabilization system may be able to have a compact or spread out geometry.

An aspect of the invention is directed to a stabilizing platform configured to stabilize a payload comprising: a frame assembly comprising a plurality of frame components movable relative to one another, said frame assembly configured to support the payload; a handle assembly that supports the frame assembly and is configured to be switchable between a first orientation and a second orientation independently of an orientation of the payload; and a plurality of motors configured to permit the frame components to move relative to one another, said plurality of motors including (1) a first motor that is configured to (a) control movement of the payload about a yaw axis when the handle assembly is in the first orientation, and (b) control movement of payload about a roll axis when the handle assembly is in the second orientation, and (2) a second motor that is configured to (a) control movement of the payload about the roll axis when the handle assembly is in the first orientation, and (b) control movement of the payload about the yaw axis when the handle assembly is in the second orientation.

The payload may be a camera.

In some embodiments, the handle assembly comprises a handle bar connecting two grips, and the frame assembly is supported on the handle bar. The handle bar may have (i) a substantially horizontal orientation when the handle assembly is in the first orientation, and (ii) a substantially vertical orientation when the handle assembly is in the second orientation. The handle assembly may be configured to be manually held by a user at one or more of the grips. The handle assembly may further comprise a third grip extending from the handle bar between the two grips.

The plurality of motors may further comprise (3) a third motor that is configured to control movement of the payload about a pitch axis when the handle assembly is in the first orientation and when the handle assembly is in the second orientation.

The frame assembly may comprise at least three frame components that are movable relative to one another. The at least three frame components may comprise a first frame component that supports the payload and permits the payload to rotate about a pitch axis relative to the first frame component. The at least three frame components may comprise a second frame component that supports the first frame component and permits the first frame component to rotate about (i) a roll axis when the handle assembly is in the first orientation, and (ii) a yaw axis when the handle assembly is in the second orientation. The at least three frame components may comprise a third frame component that supports the second frame component and permits the second frame component to rotate about (i) a yaw axis when the handle assembly is in the first orientation, and (ii) a roll axis when the handle assembly is in the second orientation.

A method of stabilizing a payload in accordance with an embodiment of the invention, said method comprising: providing the stabilizing platform as previously described; and detecting a switch from the first orientation to the second orientation of the handle assembly, or vice versa.

The handle assembly may be switched between the first orientation and the second orientation without altering a power state of the frame assembly. The plurality of motors may remain powered on while the handle assembly is switched between the first orientation and the second orientation.

The switch may be detected with aid of one or more sensors on the handle assembly, frame assembly, payload, or motors. The one or more sensors may comprise inertial sensors or Hall effect sensors. The stabilizing platform may comprise one or more processors configured to accept one or more signals from the one or more sensors and generate a signal indicative that the switch has occurred based on the one or more signals.

Additional aspects of the invention may be directed to a method of stabilizing a payload, said method comprising: providing a frame assembly comprising a plurality of frame components movable relative to one another, said frame assembly configured to support the payload; supporting the frame assembly using a handle assembly, wherein said handle assembly is configured to be switchable between a first orientation and a second orientation independently of an orientation of the payload; providing a plurality of motors configured to permit the frame components to move relative to one another, said plurality of motors including (1) a first motor controlling movement of a payload about a first axis when the handle assembly is in the first orientation, and (2) a second motor controlling movement of a payload about a second axis when the handle assembly is in the first orientation; detecting a switches from the first orientation to the second orientation of the handle assembly; and generating, with aid of one or more processors and in response to the detected switch of the handle assembly from the first orientation to the second orientation, a control signal that causes (1) the first motor to control movement of the payload about the second axis when the handle assembly is in the second orientation, and (2) the second motor to control movement of the payload about the first axis when the handle assembly is in the second orientation.

In some embodiments, the first axis may be a yaw axis. The second axis may be a roll axis.

The handle assembly may be switched between the first orientation and the second orientation without altering a power state of the frame assembly. The plurality of motors may remain powered on while the handle assembly is switched between the first orientation and the second orientation.

The payload may be a camera.

The handle assembly may comprise a handle bar connecting two grips, and the frame assembly is supported on the handle bar. The handle bar may have (i) a substantially horizontal orientation when the handle assembly is in the first orientation, and (ii) a substantially vertical orientation when the handle assembly is in the second orientation. The handle assembly may be configured to be manually held by a user at one or more of the grips. The handle assembly may further comprise a third grip extending from the handle bar between the two grips.

The plurality of motors may further comprise (3) a third motor that is configured to control movement of the payload about a pitch axis when the handle assembly is in the first orientation and when the handle assembly is in the second orientation.

The frame assembly may comprise at least three frame components that are movable relative to one another. The at least three frame components may comprise a first frame component that supports the payload and permits the payload to rotate about a pitch axis relative to the first frame component.

The switch may be detected with aid of one or more sensors on the handle assembly, frame assembly, payload, or motors. The one or more sensors may comprise inertial sensors or Hall effect sensors. The stabilizing platform may comprise one or more processors configured to accept one or more signals from the one or more sensors and generate a signal indicative that the switch has occurred based on the one or more signals.

A stabilizing platform configured to stabilize a payload may be provided in accordance with another aspect of the invention. The stabilization platform may comprise: a frame assembly comprising a plurality of frame components movable relative to one another, said frame assembly configured to support the payload; a handle assembly that supports the frame assembly and is configured to be switchable between a first orientation and a second orientation independently of an orientation of the payload; and a plurality of motors configured to permit the frame components to move relative to one another, said plurality of motors including a motor that is configured to rotate by a predetermined number of degrees when the handle assembly changes from the first orientation to the second orientation in response to a signal generated based on a detection of the handle assembly changing from the first orientation to the second orientation.

The motor may be configured to (a) control movement of the payload about a yaw axis when the handle assembly is in the first orientation, and (b) control movement of payload about a roll axis when the handle assembly is in the second orientation. The payload may be a camera.

The handle assembly may comprise a handle bar connecting two grips, and the frame assembly is supported on the handle bar. The handle bar may have (i) a substantially horizontal orientation when the handle assembly is in the first orientation, and (ii) a substantially vertical orientation when the handle assembly is in the second orientation. The handle assembly may be configured to be manually held by a user at one or more of the grips. The handle assembly may further comprise a third grip extending from the handle bar between the two grips.

A frame component driven by the motor may be substantially perpendicular to the handle bar when the handle assembly is in the first orientation, and wherein the frame component driven by the motor may be substantially parallel to the handle bar when the handle assembly is in the second orientation. The predetermined number of degrees may be 90 degrees.

The stabilizing platform may further comprise one or more processors configured to detect when the handle assembly switches from the first orientation to the second orientation and generate the signal to effect the rotation of the motor.

The plurality of motor may further comprise a second motor that is configured to (a) control movement of the payload about the roll axis when the handle assembly is in the first orientation, and (b) control movement of the payload about the yaw axis when the handle assembly is in the second orientation. The plurality of motors may further comprise (3) a third motor that is configured to control movement of the payload about a pitch axis when the handle assembly is in the first orientation and when the handle assembly is in the second orientation.

In some embodiments, the frame assembly may comprise at least three frame components that are movable relative to one another. The at least three frame components may comprise a first frame component that supports the payload and permits the payload to rotate about a pitch axis relative to the first frame component. The at least three frame components may comprise a second frame component that supports the first frame component and permits the first frame component to rotate about (i) a roll axis when the handle assembly is in the first orientation, and (ii) a yaw axis when the handle assembly is in the second orientation. The at least three frame components may comprise a third frame component that supports the second frame component and permits the second frame component to rotate about (i) a yaw axis when the handle assembly is in the first orientation, and (ii) a roll axis when the handle assembly is in the second orientation.

In some instances, a method of stabilizing a payload may be provided, said method comprising: providing the stabilizing platform as previously described; detecting when the handle assembly is switched between the first orientation and the second orientation; and rotating the motor by the predetermined number of degrees.

The handle assembly may be switched between the first orientation and the second orientation without altering a power state of the frame assembly. The plurality of motors may remain powered on while the handle assembly is switched between the first orientation and the second orientation.

Furthermore, aspects of the invention may be directed to a stabilizing platform configured to stabilize a payload comprising: a frame assembly comprising a plurality of frame components movable relative to one another, said frame assembly configured to support the payload; a handle assembly that supports the frame assembly and is configured to be switchable between a first orientation and a second orientation independently of an orientation of the payload, wherein the handle assembly comprises a handle bar connecting two grips, wherein the frame assembly is supported on the handle bar, and wherein the handle bar has (i) a substantially horizontal orientation when the handle assembly is in the first orientation, and (ii) a substantially vertical orientation when the handle assembly is in the second orientation; and a plurality of motors configured to permit the frame components to move relative to one another to keep the orientation of the payload independent of the movement of the handle assembly.

The stabilizing platform may have a greater width when the handle assembly is in the first orientation than when the handle assembly is in the second orientation. The payload may be located laterally between the two grips when the handle assembly is in the first orientation. The payload may be located at a greater height than the two grips. The payload may be located at a lesser height than the two grips. The payload may be located at a height between the two grips when the handle assembly is in the second orientation. The payload may be laterally aligned with the two grips Optionally, the center of mass of a combination of the payload and the frame assembly may be beneath the handle bar when the handle assembly is in the first orientation. The center of mass of a combination of the payload and the frame assembly may be above the handle bar when the handle assembly is in the first orientation. The center of mass of a combination of the payload and the frame assembly may be between the two grips when the handle assembly is in the second orientation.

The plurality of motors may comprise a first motor that is configured to (a) control movement of the payload about a yaw axis when the handle assembly is in the first orientation, and (b) control movement of payload about a roll axis when the handle assembly is in the second orientation. The plurality of motors may comprise a second motor that is configured to (a) control movement of the payload about the roll axis when the handle assembly is in the first orientation, and (b) control movement of the payload about the yaw axis when the handle assembly is in the second orientation. The first motor may be configured to rotate by a predetermined number of degrees when the handle assembly changes from the first orientation to the second orientation.

The handle assembly may further comprise a third grip extending from the handle bar between the two grips. The third grip may be aligned substantially perpendicularly to the two grips. The payload may be a camera.

Aspects of the invention may include a stabilizing platform configured to stabilize a payload comprising: a frame assembly comprising a plurality of frame components movable relative to one another, said frame assembly configured to support the payload; a handle assembly that supports the frame assembly and is configured to be switchable between a first orientation and a second orientation independently of an orientation of the payload; at least one sensor that provides data useful for determining whether the handle assembly has switched between the first orientation and the second orientation; and a plurality of motors configured to permit the frame components to move relative to one another to keep the orientation of the payload independent of the movement of the handle assembly.

In some embodiments, the at least one sensor is an inertial sensor. The at least one sensor may be a Hall effect sensor. At least three Hall effect sensors may be attached to at least three motors of said plurality of motors. The at least three motors may be configured to rotate the payload about a yaw axis, roll axis, and pitch axis. The stabilizing platform may further comprise one or more processors configured to calculate rotation of the handle assembly by calculating a quaternion difference. The at least one sensor may be located on the handle assembly. The at least one sensor may be located on the frame assembly. The at least one sensor may be provided with the plurality of motors. The at least one sensor may comprise at least three sensors configured to detect orientation relative to three axes. The at least one sensor may comprise a pan-tilt-zoom inertial measurement unit.

The handle assembly may comprise a handle bar connecting two grips, wherein the frame assembly is supported on the handle bar. The handle bar may have (i) a substantially horizontal orientation when the handle assembly is in the first orientation, and (ii) a substantially vertical orientation when the handle assembly is in the second orientation.

The stabilizing platform may further comprise one or more processors configured to detect when the handle assembly switches between the first orientation and the second orientation based on the signal from the at least one sensor. The one or more processors may be configured to generate a signal to at least one motor of said plurality to rotate by a predetermined number of degrees when detection occurs that the handle assembly has switched between the first orientation and the second orientation. The handle assembly may be determined to have switched between the first orientation and the second orientation when a threshold number of degrees of change in orientation is exceeded.

The plurality of motors may include (1) a first motor that is configured to (a) control movement of the payload about a yaw axis when the handle assembly is in the first orientation, and (b) control movement of payload about a roll axis when the handle assembly is in the second orientation, and (2) a second motor that is configured to (a) control movement of the payload about the roll axis when the handle assembly is in the first orientation, and (b) control movement of the payload about the yaw axis when the handle assembly is in the second orientation.

The payload may be a camera.

The handle assembly may comprise a handle bar connecting two grips, and the frame assembly may be supported on the handle bar. The handle bar may have (i) a substantially horizontal orientation when the handle assembly is in the first orientation, and (ii) a substantially vertical orientation when the handle assembly is in the second orientation. The handle assembly may be configured to be manually held by a user at one or more of the grips. The handle assembly may further comprise a third grip extending from the handle bar between the two grips.

The plurality of motors may comprise a first motor that is configured to (a) control movement of the payload about a yaw axis when the handle assembly is in the first orientation, and (b) control movement of payload about a roll axis when the handle assembly is in the second orientation. The plurality of motors may comprise a second motor that is configured to (a) control movement of the payload about the roll axis when the handle assembly is in the first orientation, and (b) control movement of the payload about the yaw axis when the handle assembly is in the second orientation. The plurality of motors may further comprise a third motor that is configured to control movement of the payload about a pitch axis when the handle assembly is in the first orientation and when the handle assembly is in the second orientation.

The frame assembly may comprise at least three frame components that are movable relative to one another.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 6 shows an example of a gimbal lock condition

DETAILED DESCRIPTION OF THE INVENTION

Figure 1:
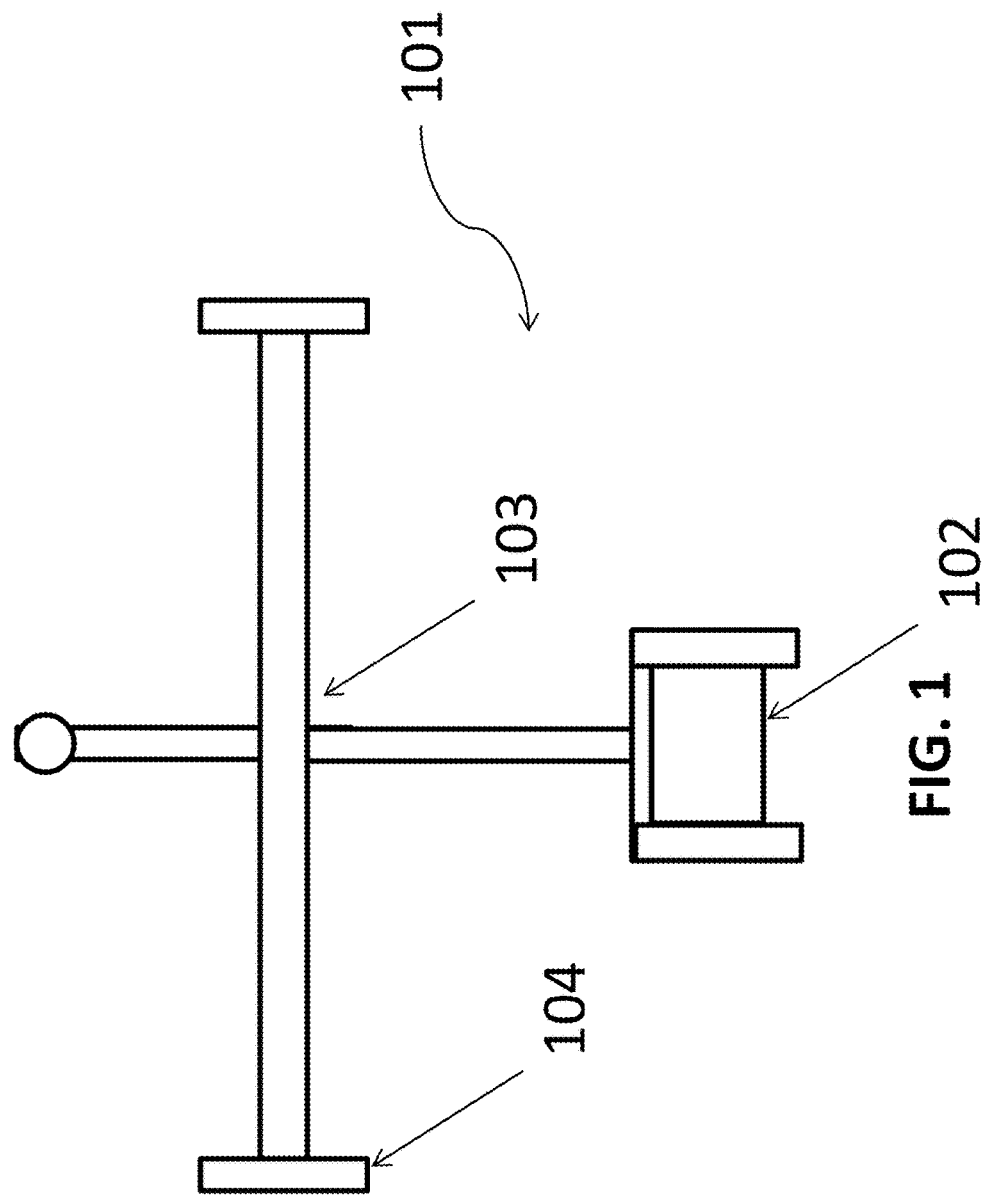
FIG. 1 shows a schematic of a stabilization platform including a frame assembly, handles, and a payload.

The systems, devices, and methods of the present invention provide a multi axis stabilization platform. Description of the multi axis stabilization platform may be applied to any other type of multi-axis stabilization frame, or any other multidimensional gimbal system. Description of the multi axis stabilization platform may apply to land-bound, underground, underwater, water surface, aerial, or space-based multi axis stabilization platforms. The stabilization platform may be a handheld platform or may be mounted on any stationary or movable object.

A stabilization platform may include a frame assembly, a handle assembly, and a plurality of motors. The frame assembly may have frame components configured to move relative to each other. The rotation of the frame components may be performed using one or more motors. Each motor may rotate a frame component about an axis. A payload may be carried by the frame. Movement of the frame components may result in a movement of the payload. In an example the payload may be a camera. The camera may be moved to follow an object of interest while shooting video of still photographs of an object. Movement of the camera may be performed using the frame components.

The frame components may be configured to attach to a handle bar assembly. The handle bar assembly may be held by a user in their hands or attached to a device which may carry the stabilization platform. The handle bar assembly may be moved relative to the payload without causing movement of the payload. For instance, a reference frame, such as an environment may be provided. The handle bar assembly may be moved relative to the reference frame while the payload may remain stationary or at a fixed orientation relative to the reference frame.

The handle bar assembly may be moved such that the stabilization platform may have a more or less compact geometry. The handle bar assembly may be moved such that the stabilization platform may be held with one or two hands or attachments. The handle bar assembly may be moved such that the center of mass of the stabilization platform including the payload is located above, below, or collinear with the handle bar assembly. Movement of the handle bar assembly may be concurrent with a change in motor control and orientation. In an example, the handle bar assembly may move from a mostly horizontal position to a mostly vertical position. Concurrent with the change in handle bar orientation, one or more motors may rotate a fixed number of degrees. Additionally the control of the motors may change, for example, the axis of rotation controlled by at least one of the motors may change.

The stabilization platform may include sensors. The sensors may recognize movement of the handle bar assembly. The sensors may be attached to the handle bar assembly, frame components, and or motors. The sensors may communicate information to a processor on board or off board the stabilization unit. The processor may use the information from the sensors to detect a change in handle bar orientation and cause a subsequent change in the orientation and/or control of at least one of the motors on the stabilization platform.

FIG. 1 shows a high level schematic of a stabilizing platform 101 in accordance with an embodiment of the invention. The stabilizing platform 101 may be configured to stabilize a payload 102. The payload 102 may be supported by a frame assembly 103, which may be carried by handle assembly 104. The payload may be, for example, a camera, a sensor, a passenger, or cargo.

The payload 102 may be secured in a frame assembly 103. The frame assembly 103 may be formed from a metallic, composite, or plastic material. The frame assembly may be configured to support a payload with a weight of at least 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, 20 kg, 30 kg, 40 kg, 50 kg, 60 kg, 70 kg, 80 kg, 90 kg, or 100 kg. The frame assembly 103 may be configured to support a payload with a weight of less than any of the values provided herein. The frame assembly 103 may be configured to support a payload with a weight falling in a range between any two of the values provided herein.

Furthermore the frame assembly 103 may be configured to support a payload with a longest dimension of at least 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, 300 cm, 350 cm, 400 cm, 450 cm, or 500 cm. The frame assembly 103 may be configured to support a payload with a longest dimension of less than any of the values provided herein. The frame assembly may be configured to support a payload with a longest dimension falling in a range between any two of the values provided herein.

The frame assembly 103 may be configured to support a payload with a volume of at least 1 $mm^3$, 5 $mm^3$, 1 $cm^3$, 3 $cm^3$, 5 $cm^3$, 10 $cm^3$, 12 $cm^3$, 15 $cm^3$, 20 $cm^3$, 25 $cm^3$, 30 $cm^3$, 35 $cm^3$, 40 $cm^3$, 45 $cm^3$, 50 $cm^3$, 55 $cm^3$, 60 $cm^3$, 65 $cm^3$, 70 $cm^3$, 75 $cm^3$, 80 $cm^3$, 85 $cm^3$, 90 $cm^3$, 95 $cm^3$, 100 $cm^3$, 110 $cm^3$, 120 $cm^3$, 130 $cm^3$, 140 $cm^3$, 150 $cm^3$, 160 $cm^3$, 170 $cm^3$, 180 $cm^3$, 190 $cm^3$, 200 $cm^3$, 220 $cm^3$, 250 $cm^3$, 300 $cm^3$, 350 $cm^3$, 400 $cm^3$, 450 $cm^3$, or 500 $cm^3$. The frame assembly 103 may be configured to support a payload with a volume less than any of the values provided herein. The frame assembly may be configured to support a payload with a volume falling in a range between any two of the values provided herein.

A payload may be a sensor. For example, a payload may be an audio, vision, olfactory, positioning, temperature, or motion sensor. In an example the payload may be a camera. Examples of payloads may further comprise: location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used or provided as a payload, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy). In other embodiments, payloads may include emitters, such as visual, sound, or other signal emitters. For instance, an emitter may be a light source. The payload may be oriented in the stabilization platform such that it is directed at an object or region of interest.

In an example the stabilization platform may have a camera as the payload. The camera may be a film or digital camera. The camera may be able to capture video recordings or still photographs. The camera may be a micro lens camera, a point and shoot camera, a mobile phone camera, a professional video camera, or a camcorder. The stabilization platform may be configured to achieve a desired camera angle with a precision of at least ±5°, ±4°, ±3°, ±2°, ±1°, ±0.75°, ±0.5°, ±0.4°, ±0.3°, ±0 0.2°, ±0.1°, ±0.08°, ±0.06°, ±0.04°, ±0.02°, ±0.01°, or ±0.005°.

The orientation of the payload may be controlled by the processor on board the stabilization unit in response to movement of the handle assembly 104 by a user. The processor may be programmed to calculate a payload orientation and/or generate a signal to effect the desired payload orientation. The processor may receive signals from one or more sensors indicative of handle assembly orientation and/or movement and may generate signals to effect actuation of one or more motors to effect the desire payload orientation. Any description herein of a processor may apply to one or more processors that may individually or collectively perform any of the actions described.

The processor may be able to automatically calculate and/or determine a desire payload orientation autonomously without requiring additional input from an external device or user. In some instances, the desired payload orientation may remain substantially constant with respect to a reference frame. Alternatively, the desired payload orientation may change with respect to the reference frame. In other embodiments, the desired payload orientation may be calculated and/or determined based on a signal received from an external device, such as a remote control. Similarly, the desired payload orientation may be calculated and/or determined based on a signal received from a user input interface of the handle assembly. For example, the operator of the stabilization platform or another individual operating an external device or remote control may provide input regarding the orientation of the payload with respect to the reference frame.

Additionally, when the payload is a camera, the camera settings may be controlled by another user by a remote control or user input components built into the stabilization platform. Examples of camera settings may be white balance, aperture size, shutter speed, focal length, zoom, or ISO sensitivity.

The frame assembly 103 may have a plurality of frame components. The frame components may be rigid parts. The components may be configured to move relative to each other. The movement of the components may be about a joint for example the joint may be a hinge, ball and socket, plane joint, saddle, or pivot. Movement of the frame components may be controlled by one or more motors. Optionally, one or more motors may be provided at the joints between the components. Each frame component may be moved by one motor or a plurality of frame components may be moved by a single motor. Frame components may be rotated about an axis. Each component may rotate about one, two, three, or more axes. The axis of rotation may be defined in a fixed or non-fixed reference frame. Additionally the frame components may be configured to translate in at least one direction. The joints may further comprise Hall sensors which may detect the position, and/or rotation of the frame components relative to each other at each joint location.

The frame assembly may permit a payload to rotate about one, two, three or more axes relative to a handle assembly. In some instances the handle assembly may be rotating about one, two, or three axes relative to a reference frame.

The payload may or may not remain at the same orientation with respect to the reference frame while the handle assembly may move. Optionally, one, two, three or more motors may be provided that may permit the payload to rotate with respect to the handle assembly. The payload may rotate about three orthogonal axes with respect to the handle assembly. In some instances, the payload may rotate about a pitch, roll, and/or yaw axis with respect to the payload.

The frame assembly may be supported by a handle assembly 104. The handle assembly 104 may bear the weight of the frame assembly. The handle assembly may be located at a terminal end of the frame assembly. The handle assembly may include one or more grips that may be configured to move relative to each other to change between various configurations. The movement of the handle assembly (e.g., the grips) may be independent of the movement of the payload.

Figure 2:
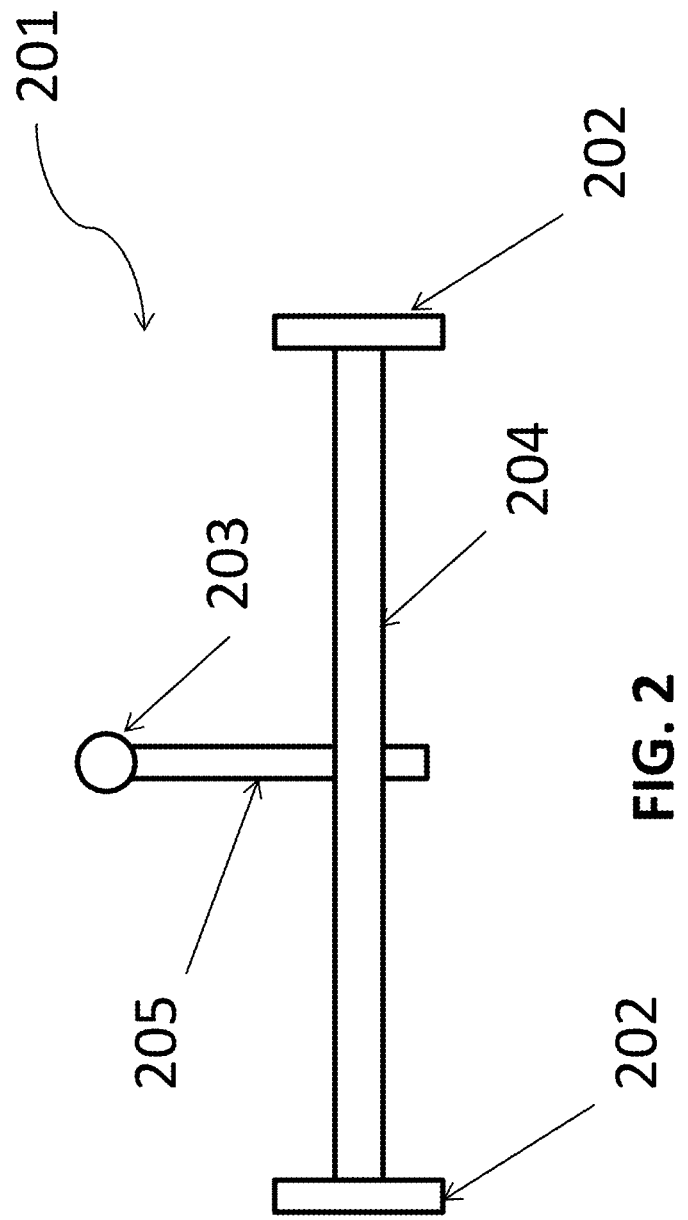
FIG. 2 shows an example of a handle assembly of a stabilization platform.

An example of a handle assembly 201 is shown in FIG. 2. The handle assembly may include a handle bar 204 connecting two grips 202. The two grips may be substantially parallel to each other and perpendicular or parallel to the handle bar. In some embodiments, the grips may be within about plus or minus 30, 25, 20, 15, 10, 5, 3, or 1 degree of being parallel to one another. In some embodiments, the grips may be within about plus or minus 30, 25, 20, 15, 10, 5, 3, or 1 degree of being perpendicular to the handle bar. In some instances, an end of a grip may join the handle bar. Alternatively, an end of a grip may extend beyond the handle bar. The handle assembly may be configured to be manually held by a user at the grips 202. The frame assembly may be supported on the handle bar.

Additionally, the handle bar may have a third grip 203 between the two connected grips. The third grip may be connected to a handle bar directly or may be connected with aid of a bar 205. The third grip may be substantially perpendicular or parallel to the other two grips on either terminal end of the handle bar. Optionally, the third grip may be substantially perpendicular to both the other grips and/or the handle bar simultaneously. The third grip and/or bar may be directly and/or fixedly attached to the handle bar 204. Alternatively, the third grip and/or bar may be removable from the handle bar. The third grip and/or bar may or may not attach to or be connected to a frame assembly.

The frame assembly may be supported by the handle assembly. The handles (which may be grips) may be configured to be held by a person's hands. The grips may have a textured surface that may prevent a user's hands from slipping while holding the handles. The grips may include a covering material. In some instances, the covering material may include plastic, foam, rubber, or other semi soft or malleable material. Additionally, the handles may have an ergonomic design such that a user may hold the handle for an extended period of time without experiencing wrist or joint pain.

The stabilization platform may be carried by a human. The handle assembly may be configured to permit a human to carry the stabilization platform by holding one or more grips in the human's hands. An individual may hold two grips simultaneously, or may hold a single grip. The individual may hold one or more of the terminal grips or the third grip. In another example, the handle assembly may be configured to attach to another object, such as a vehicle. A vehicle may be a car, truck, aircraft, unmanned aerial vehicle (UAV), bus, boat, train, motorcycle, bicycle, moving platform, or a tractor. The handle assembly may be configured to attach to a movable object, such as those described elsewhere herein. The handle assembly may also be configured to attach to a stationary object. The handle assembly may attach to a boom which may be mounted on a fixed or movable object.

Figure 3:
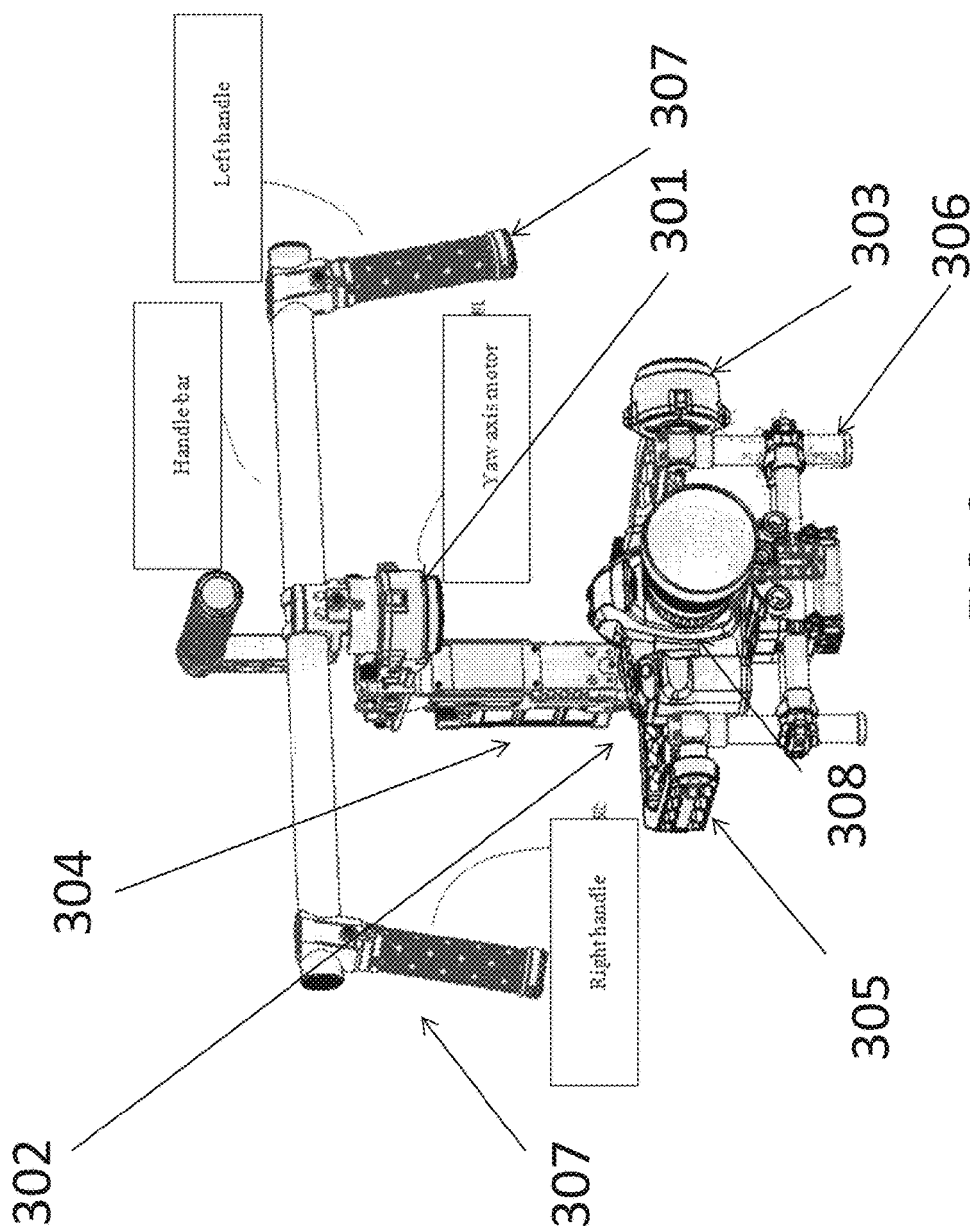
FIG. 3 shows a detailed view of an example of a stabilization platform in a horizontal configuration.

Components of the frame assembly may be moved relative to each other by motors connected to the frame assembly. FIG. 3 shows a detailed view of the stabilizing platform including a first 301, second 302 (not directly shown in FIG. 3), and third motor 303. In some embodiments the stabilizing platform may have at least 1, 2, 3, 4, 5, 6, 7, 8, 9, or 10 motors configured to move the frame assembly components 304, 305, 306 relative to each other. Alternatively the frame assembly components may be moved manually in a design without motors.

The frame assembly may have at least one, two, or three frame components 304, 305, and 306. The three components may each be configured to rotate the payload along a given axis of rotation. For example, the frame component 304 may rotate in about a yaw axis, the frame component 305 may rotate about a roll axis, and the frame component 306 may rotate about a pitch axis. Any of the components may be configured to rotate about an additional axis. The components may additionally be configured to translate in at least one dimension.

In some embodiments, a first frame component 304 may be directly supported by a handle assembly. The first frame component 304 may be configured to move about a first axis of rotation (e.g., yaw axis) when the handle assembly is in a first orientation. The movement of the first frame component 304 about the first axis of rotation may be driven and/or controlled by a first motor 301. A second frame component 305, may be directly supported by the first frame component. The second frame component 305 may be configured to move about a second axis of rotation (e.g., roll axis) when the handle assembly is in a first orientation. The movement of the second frame component 305 about the second axis of rotation may be driven and/or controlled by a second motor 302. A third frame component 306, may be directly supported by the second frame component 305. The third frame component 306 may be configured to move about a third axis of rotation (e.g., pitch axis) when the handle assembly is in a first orientation. The movement of the third frame component 306 about the third axis of rotation may be driven and/or controlled by a third motor 303. The third frame component 306 may be configured to support a payload 308, such as a camera. The third frame component may be configured to support the payload in a fixed manner (e.g., the payload not moving relative to the third component). Alternatively, the payload may be movable relative to the third component.

The frame components may be substantially rigid. The frame components may have any shape. The frame components may include one or more straight or curved pieces that may be connected to one another. In some example, the frame components may include a substantially Y shape or U shape. The frame components may include a first bar connected to a second bar in a substantially orthogonal manner, and the second bar may be connected to the third bar in a substantially orthogonal manner. The first and third bar may or may not be substantially parallel.

The stabilizing platform may include a handle assembly that may include one or more grips 307. A user may hold the grips and may change to the orientation of the handle assembly. The payload 308 may remain stabilized while the handle assembly may change orientation. The frame components 304, 305, 306 may move relative to one another and/or the handle assembly in order to keep the payload stabilized while the handle assembly may change orientation. The motors 301, 302, 303 may be actuated to permit and/or cause the frame components to move relative to one another. Stabilizing the payload may include keeping the payload at the same orientation or changing the orientation in a controlled manner. Stabilizing the payload may include keeping the payload at the same translational position or changing the translational position of the payload in a controlled manner. Changing the orientation and/or translational position of the payload may occur in a smooth manner (e.g., with reduced jerkiness or shaking). This may be advantageous when the payload is a camera and it is desirable to collect a substantially stabilized image.

Figure 4:
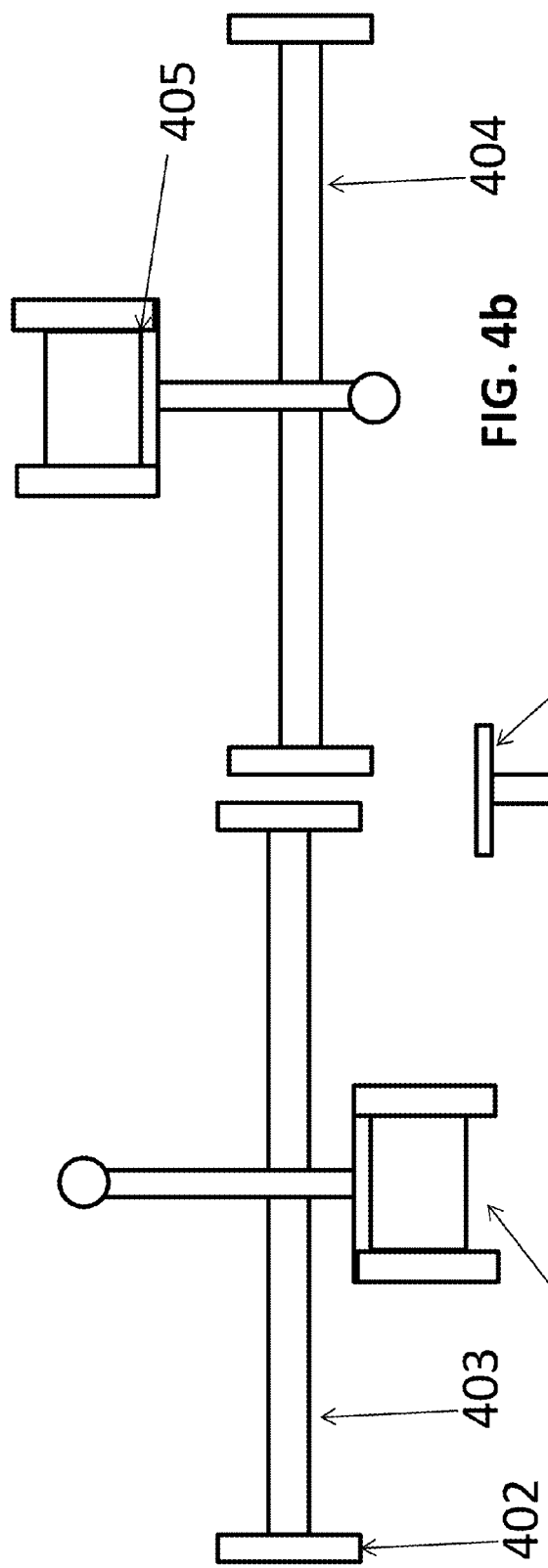
FIG. 4a-c shows schematics of three possible stabilization platform configuration modes.

Components of a stabilization platform may move relative to each other to achieve three distinct configurations. A first possible configuration is shown in FIG. 4a. The configuration shown in FIG. 4a illustrates an underslung mode. In the underslung mode, a payload 401 may be located between two grips 402. The payload 401 may be located laterally between two grips. The payload 401 may be beneath the two grips based on height. A user may choose to hold the stabilization platform with two hands in underslung mode. For instance, a user may grasp each of the two grips that may be connected by a handle bar 403. The handle bar may be oriented horizontally when in the underslung mode. In the underslung mode, the center of mass of the combination of a frame assembly and the payload may be below the handle bar and/or grips. The center of mass of the payload may be below the handle bar and/or grips. The center of mass of the payload, or the combination of the payload and the frame assembly, may be laterally between the grips. Underslung mode may orient the payload to face objects or regions below the hand height of the user.

In another configuration, shown in FIG. 4b, the stabilization platform is arranged in an upright mode. In upright mode the payload 405 may be oriented above one or more handles and/or handle bar 404. The user may choose to hold the frame with two hands in upright mode. The center of mass of the combination of the frame and the payload 405 may be located above the frame in the upright mode. The center of mass of the payload may be above the handle bar and/or grips. The center of mass of the payload, or the combination of the payload and the frame assembly may be laterally between the grips. The frame assembly and/or the payload may be located laterally between the grips. Upright mode may orient the payload to face objects or regions above the hand height, or at eye level of the user.

A third configuration of the stabilizing platform is shown in FIG. 4c. The configuration shown in FIG. 4c may be referred to as the briefcase mode. A user may hold the stabilizing platform with one hand while the platform is in briefcase mode. For example, a user may grasp an upper handle 406 of a handle assembly when the stabilizing platform is in briefcase mode. A handle bar 407 connecting two grips may be in a substantially vertical orientation. The frame assembly and/or payload may be located between the two grips. The height of the frame assembly and/or the payload may be between the heights of the two grips. Laterally, the two grips and the frame assembly and/or the payload may be substantially aligned. For instance, an axis may pass through the two grips and the frame assembly and/or payload. The center of mass of the combination of the frame and the payload, or of the payload alone, may be between two hand grips, when the stabilizing platform is in briefcase mode. The height of the center of mass of the frame assembly and the payload (or of the payload alone) may be between the heights of the two grips. Laterally, the two grips and the center of mass of the frame assembly and/or the payload may be substantially aligned. For instance, an axis may pass through the two grips and the center of mass of the frame assembly and/or payload.

The stabilizing platform may move between any of the configurations described herein. For example, the stabilizing platform may move between an underslung, upright, and/or briefcase mode. Any of the intermediary configurations between the modes may continue to stabilize a payload. For example, any intermediary configurations may be provided where a handle bar is neither horizontal nor vertical. An operator of the stabilizing platform may or may not hold the stabilizing platform at an intermediary configuration, or may provide intermediary configurations while moving between different modes.

The stabilizing platform may have a greater width in the horizontal modes (e.g. underslung, upright) than in the vertical modes (e.g. briefcase). The vertical modes may allow for a more compact geometry compared to the horizontal modes. The vertical modes may provide a stabilization mode with a lesser width, a smaller footprint, and/or smaller lateral area than the horizontal modes. In an example where the payload is a sensor, the vertical modes may be preferable for sensing an object or a region in a narrow space. Upright mode may similarly be preferable for sensing regions or objects above the height of the user. Upright mode may allow the payload to face objects or regions above a plane holding the stabilization platform.

The different modes may result from different orientations of the frame and handle assembly, altering the frame and handle assembly may not result in a change in the payload orientation. The handle assembly may change orientations independently of the payload orientation and vice versa. For example, when the handle and frame assembly changes between a largely horizontal (e.g. underslung of upright modes) mode to a largely vertical mode (e.g. briefcase mode) the payload may remain in a consistent orientation. In an example, the payload may stay in a horizontal orientation during a change in the handle and frame assembly from a horizontal to vertical orientation. Alternatively, the payload may stay in a vertical orientation during a change in the handle and frame assembly from a horizontal to vertical orientation. The motors may permit the frame components to move relative to one another to the keep the orientation of the payload independent of the movement of the handle assembly.

Figure 5:
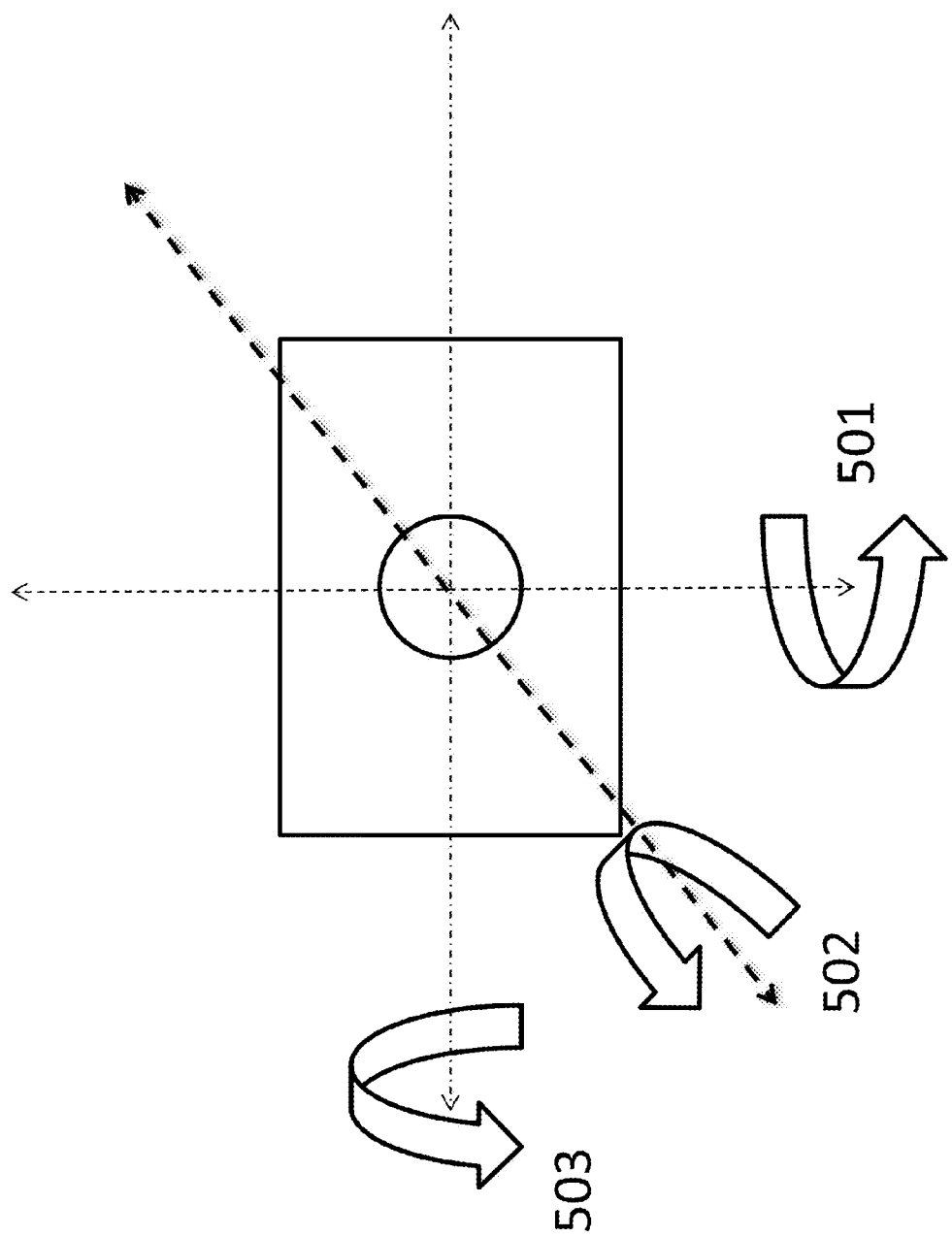
FIG. 5 shows the possible axes of rotation of the payload by the stabilization platform.

The stabilizing platform may comprise a three-axis gimbal assembly which may be configured to permit rotation of the payload about one, two, or three axes. The payload may rotate around a yaw, roll, and/or pitch axis. In some instances the payload may be capable of rotating about a yaw, roll, and pitch axis relative to a handle assembly. Optionally, the payload may be capable of rotating about a yaw, roll, and pitch axis relative to a fixed reference frame. FIG. 5 shows three possible rotation axes for the payload. The axes shown in FIG. 5 are a yaw axis 501, roll axis 502, and pitch axis 503. The axes may be defined in a reference frame of the payload as shown in FIG. 5. In another example, the axes may be defined in a reference frame with respect to a handle assembly. The axes may be defined in a fixed reference frame, such as an environment where the stabilizing platform may be in operation (e.g., such as Earth). The axes may or may not intersect. One, two, or three of the axes may pass through the payload. Two or three of the axes may intersect within the payload. The intersection may or may not occur at a center of mass of the payload. The intersection may or may not occur at a center of mass of a combination of the payload and the frame assembly. Alternatively, two or three of three of the axes may intersect outside the payload. The axes may be defined in a fixed or non-fixed reference frame. The axes may be defined by a Cartesian, spherical, or cylindrical coordinate system. The payload may rotate clock-wise or counter-clockwise about the rotational axes shown in FIG. 5.

The rotation may be performed by a motor which may cause rotation of a frame component which may in turn rotate the payload in a fixed reference frame. Alternatively, a frame component may be rotated while the payload is kept stationary relative to a fixed reference frame. A handle assembly may move with respect to one or more of the axes while the payload may maintain the same orientation with respect to the fixed reference frame.

The motor may be an AC or DC motor. Any description herein of a motor may apply to any type of motor or other actuator. Motors may be direct drive motors. Other examples of types of motors may include, but are not limited to brushed or brushless motors, servomotors, switched reluctance motors, stepper motors, or any other types of motors.

The motor may be powered by an energy source, such as a battery system, on the stabilizing platform. Alternatively the motor may be powered by a power cord connected to an external power source. Each rotation axis may be controlled by a motor. For instance, a first motor may effect rotation about a yaw axis, a second motors may effect rotation about a roll axis, and a third motor may effect rotation about a pitch axis. In the various configurations, modes, of operation the rotation axis of the motors may change. For example, in the modes where the stabilization platform is held by the user with two hands (e.g. the underslung and upright modes) a first motor may control the yaw axis rotation, a second motor may control the roll axis rotation, and a third motor may control the pitch axis rotation. Alternatively, in a mode where the stabilization platform is held by the user with one hand (e.g. briefcase mode) first motor may control the roll axis rotation, a second motor may control the yaw axis rotation, and a third motor may control the pitch axis rotation. Similarly, when a handle of assembly of a stabilization platform is at a first orientation, a first motor may control yaw axis rotation while a second motor may control roll axis rotation. When the handle of assembly of the stabilization platform is at a second orientation, the first motor may control roll axis rotation while the second motor may control yaw axis rotation. Optionally, a third motor may control pitch axis rotation when the handle bar assembly is in the first orientation and the second orientation. In some implementations, the first orientation may include a substantially horizontally oriented handle bar while the second orientation may include a substantially vertically oriented handle bar. Power may be supplied to the motors continuously during a switch in mode of the stabilization platform orientation.

Rotation of a payload by a three axis gimbal may encounter gimbal lock. Gimbal lock may be a condition in which one of the three axes is rotated to an extent such that it lines up with a second rotation axis. Gimbal lock may result in a deterioration of the control of the rotation of the payload. An example of a gimbal lock scenario is shown in FIG. 6. In the case shown in FIG. 6 a first orientation of the gimbal has axes 601, 602, and 603 not overlapping such that gimbal lock is not encountered. In the second case shown in figure axis 601 has rotated such that it overlaps with axis 603. This overlap represents an example of gimbal lock. When gimbal lock occurs, the system may lose a degree of freedom. It may be advantageous to avoid gimbal lock.

The stabilization platform may be configured to reduce or eliminate instances of gimbal lock. The stabilization platform may comprise a set of sensors that may detect rotations of the payload that cause the gimbal to approach a gimbal lock condition. For example, as a rotation about the yaw axis approaches 90° the gimbal may approach a gimbal lock condition. A rotation about the yaw axis sufficient to induce gimbal lock may occur when switching between a first and second operation mode of the stabilization platform. The stabilization platform may have sensors on the frame, motors, and/or handles that may detect the rotation of the stabilization platform about the yaw, roll, and pitch axes. For example the sensors may be inertial sensors (e.g., positional or angular displacement sensors, velocity sensors, accelerometers, gyroscopes, magnetometers), capacitive sensors, Hall sensors, or any other types of sensors as described elsewhere herein. The sensors may be capable of detecting linear and/or angular displacement, linear velocity and/or angular velocity, or linear or angular acceleration. The sensors may or may not be provided on any portion of the handle assembly, such as a grip, handle bar, bar, or any other portion. The sensors may or may not be provided on one, two, three or more of the frame components. The sensors may or may not be provided on one, two, three or more of the motors. The sensors may or may not be provided on the payload. A processor onboard or off-board the stabilization platform may interpret the sensor data to detect a rotation about a yaw, roll, or pitch axis. Sensor data from any component of the stabilizing platform may be used to detect positional information and/or rotation of the component. Sensor data from multiple components may be gathered and/or compared. In some instances, the sensor data from the components may be used to determine motion of the payload relative to the handle assembly or vice versa, motion of the payload relative to a fixed reference frame, motion of the handle assembly relative to the fixed reference frame, motion of any of the frame components relative to the fixed reference frame or any variation or combination thereof.

When a processor detects a rotation of the handle assembly indicating a change from a first mode/configuration, to a second mode/configuration the processor may change the motor control orientation. For example in a first mode a first motor may control the yaw axis rotation and a second motor may control the roll axis rotation. When the processor detects a change from a first to a second mode the processor may switch the motor control such that a first motor may control the roll axis rotation and a second motor may control the yaw axis rotation. In a first and second mode, the pitch axis motor control may not change such that a third motor may control the pitch axis rotation in both the first and second mode. The change in motor control may occur without a change in the power supply to the motor such that continuous power may be supplied to the motor while the axis control of the motor is changed.

Figure 18:
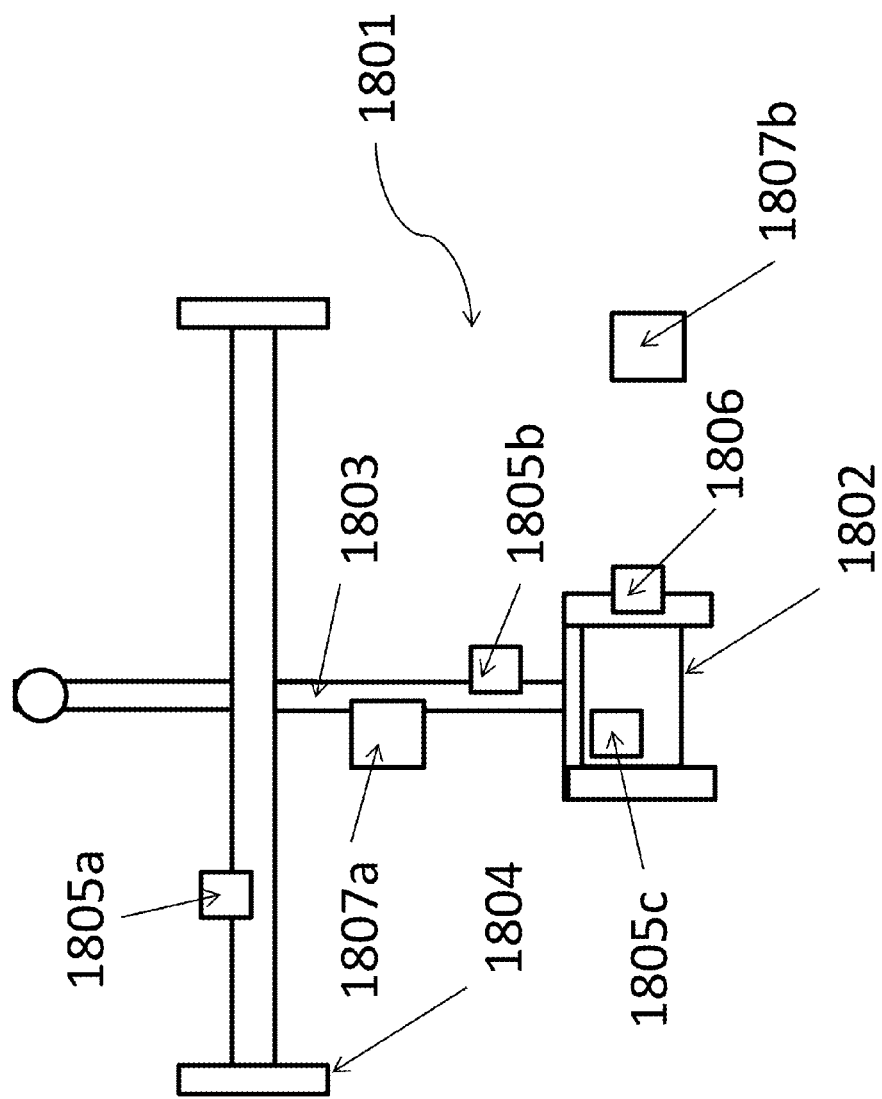
FIG. 18 shows a schematic of stabilization platform including one or more sensors and one or more processors communicatively coupled to the one or more sensors in accordance with an embodiment of the invention.

FIG. 18 shows a schematic of stabilization platform including one or more sensors and one or more processors communicatively coupled to the one or more sensors in accordance with an embodiment of the invention. As previously described, a stabilization platform 1801 may support a payload 1802. The stabilization platform may include a frame assembly 1803 and handle assembly 1804. One or more sensors 1805a, 1805b, 1806 may be provided on the stabilization platform. In some instances, one or more sensors 1805a may be supported by a handle assembly 1804, one or more sensors 1805b may be supported by a frame assembly 1803, and/or one or more sensors 1805c may be supported by a payload 1802. In some instances, one or more motors 1806 may be provided on the stabilization platform. The motors may permit frame components of a frame assembly to move relative to other frame components or relative to the handle assembly. The motor may have one or more sensors provided thereon, or built into the motor. In some instances, the stabilization platform may have an on-board processor 1807a. Alternatively, an off-board processor 1807b may be provided. Any combination of on-board and/or off-board processors may be provided or utilized.

One or more processors 1807a, 1807b may receive signals from one or more sensors 1805a, 1805b, 1805c. The signals from the sensors may be used to detect orientation and/or movement of one or more components of the stabilization platform. For example, the signals from the sensors may be indicative of orientation and/or movement (e.g., angular velocity, angular acceleration, linear velocity, linear acceleration) of the handle assembly, frame components, payload, motor, or any other portion of the stabilization platform. The processor(s) may use the signals to determine whether a handle assembly has changed orientation, or whether any other component has moved. Based on the determination, the processor(s) may generate a signal that may be transmitted to one or more motors 1806. The generated signal may result in actuation and/or maintenance of a motor. The generated signal may control motors in a manner to permit the payload to remain stabilized while other components of the stabilization platform may move. The generated signal may control motors in a manner to permit the payload to remain level or at the same orientation while other components of the stabilization platform may move.

Figure 7:
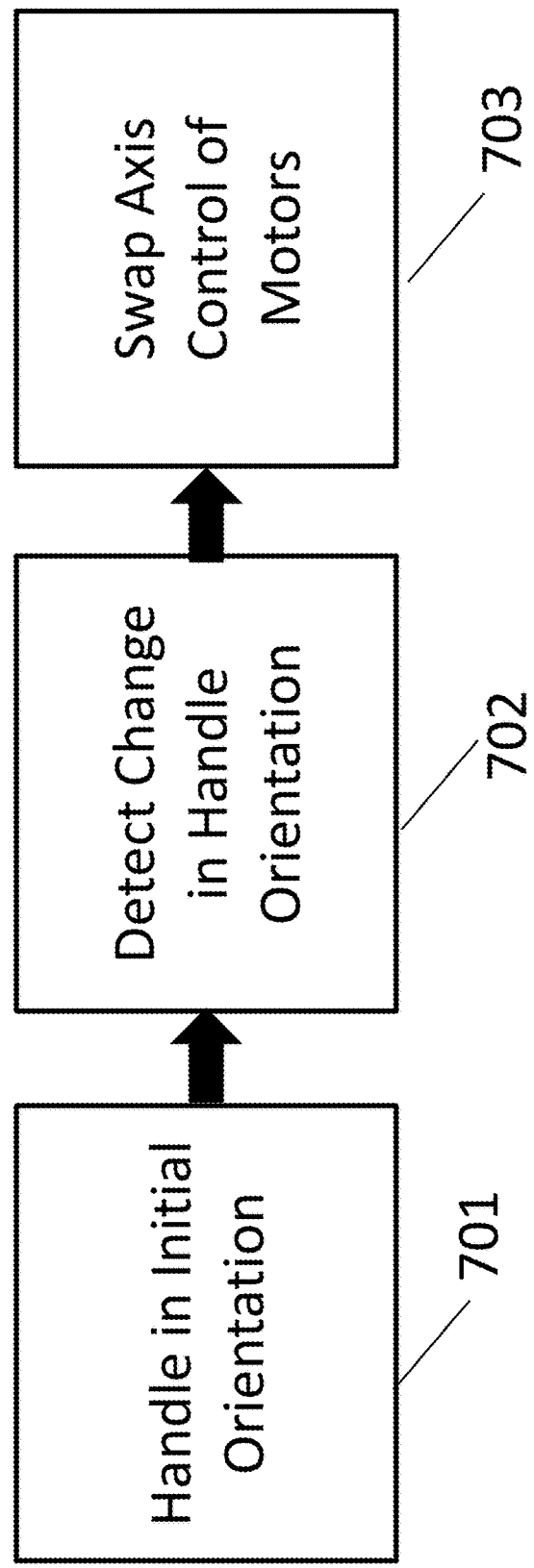
FIG. 7 shows possible steps performed by a processor in response to a change in frame orientation.

FIG. 7 outlines a possible detection and response procedure of one or more processors to a frame rotation. Initially, the stabilization platform may a first mode or second mode 701. In some instances a handle bar of the stabilization platform may have a horizontal orientation when in the first mode and a vertical orientation when in the second mode. The processor may detect a change in the stabilization platform mode by input from one or more sensors 702. For example, a change in the stabilization platform mode may be a rotation of the handle bar assembly from a horizontal to a vertical configuration, or vice versa. The one or more sensors may detect an angular acceleration, velocity, or orientation of the handle bar configuration as the handle assembly may rotate from a horizontal to vertical or vertical to horizontal configuration. In an example, the angular orientation, velocity, or acceleration may be sensed by an inertial measurement unit, a group of Hall sensors, or any other type of sensors, such as those described elsewhere herein. The sensors may communicate with the processor wirelessly or through a wired connection.

One or more processors may receive information from sensors. The processors may make a determination whether a stabilization platform has switched modes (e.g., whether a handle assembly has changed orientation). Based on the information from the sensors, a signal may be generated and used to control one or more motors. The one or more motors may be used to maintain and/or alter the position of the payload relative to the handle assembly. In response to a change in orientation of the handle assembly, the processor may instruct a change in motor control 703. The change in motor control may include changing the rotational axis that is being controlled by one or more motors. For example, a first motor may be used to control rotation about a first axis when the handle assembly is in the first orientation. A second motor may be used to control rotation about a second axis. When a change in the orientation of the handle assembly to a second orientation is detected, the first motor may be used to control rotation about the second axis. The first motor may be used to control rotation about the first axis. The first axis may be a yaw axis while the second axis may be a roll axis, or vice versa. Control algorithms may be updated to include the change in order of axis control. In another example, a change in motor control may be to turn off or on a motor on the stabilization platform. The change in motor control may instruct one or more of the motors to change rotation direction, speed, or axis. The step of detecting the change in mode, handle bar assembly orientation, may occur simultaneously with the change in motor control. These steps may occur repeatedly to change back and forth between a first and second configuration of the stabilization platform. For example, if the handle assembly configuration is changed back from the second orientation to the first orientation, the first motor may be changed back to controlling motion about a first axis while the second motor may be changed back to controlling motion about a second axis. Computations may be made taking into account the changes in the axes that the motors are controlling when generating signals to control the motors to stabilize the platform. For example, if it is desirable to rotate the payload about a yaw axis, instructions may be sent to the first motor to effect rotation when the handle assembly is in the first orientation, and instructions may be sent to the second motor to effect rotation when the handle assembly is in the second orientation. Similarly, if it is desirable to rotate the payload about a roll axis, instructions may be sent to the second motor to effect rotation when the handle assembly is in the first orientation, and instructions may be sent to the first motor to effect rotation when the handle assembly is in the second orientation.

Figure 8:
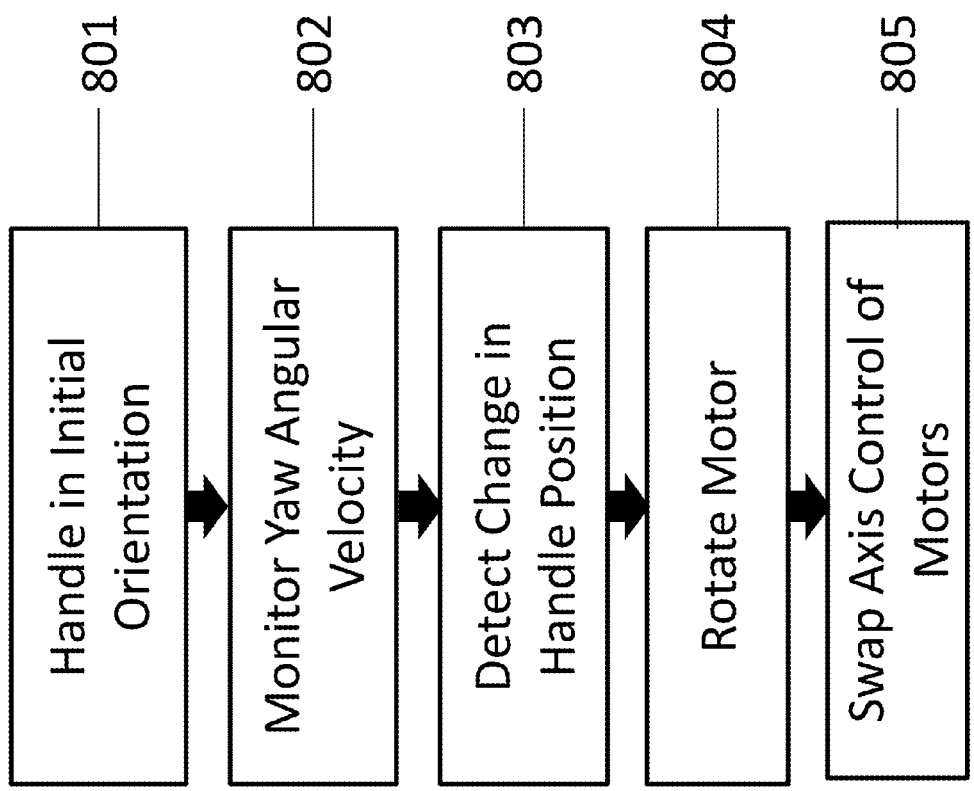
FIG. 8 shows possible steps performed by a processor to alter motor control and orientation.

In addition to switching the motor control the processor may further instruct a rotation of one or more motors. FIG. 8 outlines an example of a detection and response including the motor control change and a rotation of a motor. The stabilization platform may have an initial configuration 801, for example, the initial configuration may be a horizontal or vertical configuration of a handle assembly or other component of the stabilization platform. The sensors on board the stabilization platform may monitor the rotation of the handle assembly, frame components, and/or payload about the yaw, roll, and/or pitch axes 802. The sensors may transmit information about the rotation of the handle assembly, frame components, and/or payload about the yaw, roll, and/or pitch axes to a processor. The sensors may transmit the information by a wired connection or by a wireless connection.

The processor may be onboard or off-board the stabilization platform. Any description herein of a processor may apply to any number of processors, which may all be on-board the stabilization platform, off-board the stabilization platform, or any combination of on-board and off-board the stabilization platform. The processors may individually or collectively be configured to perform any of the steps described.

The processor may interpret the information from the sensors to detect a change in handle assembly position from a first to a second configuration 803. In response to the detected change the processor may instruct at least one of the motors to rotate a finite number of degrees about a single axis 804. For example, the motor may rotate about 90°. In one example, the first motor may be instructed to rotate a predetermined number of degrees (e.g., 15, 30, 45, 60, 75, 90, 105, 120, 150, or 180 degrees. The first motor may be instructed to rotate 90 degrees, so that a frame component driven by the motor also rotates by 90 degrees. A bar of the frame component may be perpendicular to a handle bar of a handle assembly, when the handle assembly is in a first orientation. The motor may rotate the bar of the frame component to be parallel to the handle bar, when the handle assembly is in the second orientation. The bar may be rotated to remain substantially parallel to a direction of gravity. In some instances, the first motor may control the rotation of the payload about a yaw axis when the handle assembly is in a first orientation and the rotation of the payload about a roll axis when the handle assembly is in the second orientation. The rotation of the first motor may occur concurrently with switching the orientation of the handle assembly. The processor may communicate with one or more of a plurality of motors wirelessly or through a wired connection.

After the rotation of the motor or concurrent with the rotation of the motor the processor may instruct a change in motor control of two or more axes 805. For example, the processor may cause a first motor to change from controlling rotation of a frame component about a yaw axis to controlling rotation of a frame component about a roll axis. A second motor may be instructed by the processor to change from controlling rotation of a frame component about a roll axis to controlling rotation of a frame component about a yaw axis.

In an example, the stabilization platform may have an initial horizontal configuration shown in FIG. 3. The horizontal configuration may the underslung mode of the stabilization platform. In the underslung mode, the platform may be held with two hands on handles 307 attached to either side of a handle bar. The payload 308 may be located below the handles such that the center of mass of the frame assembly and payload system is below the handles. The yaw axis motor 301 may be a first motor. The yaw axis motor may be located above the payload when the stabilization platform is in an underslung mode. The yaw axis motor may be located beneath the payload when the stabilization platform is in an upright mode. The yaw axis motor may be the motor closest to the handle bar. The yaw axis motor may effect rotation of a first frame component 304. The rotation of the first motor and/or first frame component may effect the rotation of other frame components 305, 306 and/or payload 308 supported by the first frame component.

A roll axis motor 302 may be a second motor. The roll axis motor may be located behind the payload when the handle assembly is in a horizontal configuration. The roll axis motor may be located behind the payload when the stabilization platform is in an underslung mode or in an upright mode. The roll axis motor may be further from the handle bar than the yaw axis motor. The roll axis motor may effect rotation of a second frame component 305. The rotation of the roll axis motor may effect rotation of other frame components 306 and/or payload 308 supported by the second frame component. In some instances, the first frame component 304 is not supported by the second frame component, and actuation of the second motor does not effect movement of the first frame component.

The system may further include a third motor 303 dedicated to controlling the pitch rotation of the payload 308. The third motor may be a pitch axis motor. The third motor may be located to the right or left of the payload. The third motor may be located to the right or left of the payload when the stabilization platform is in underslung mode, upright mode, or briefcase mode. The third motor may effect rotation of a third frame component 306. The rotation of the roll axis motor may effect rotation of the payload 308 and/or any other frame components that may be supported by the third frame component. In some instances, the first and/or second frame components 304, 305 are not supported by the third frame component, and actuation of the third motor does not effect movement of the first and/or second frame components.

Figure 9:
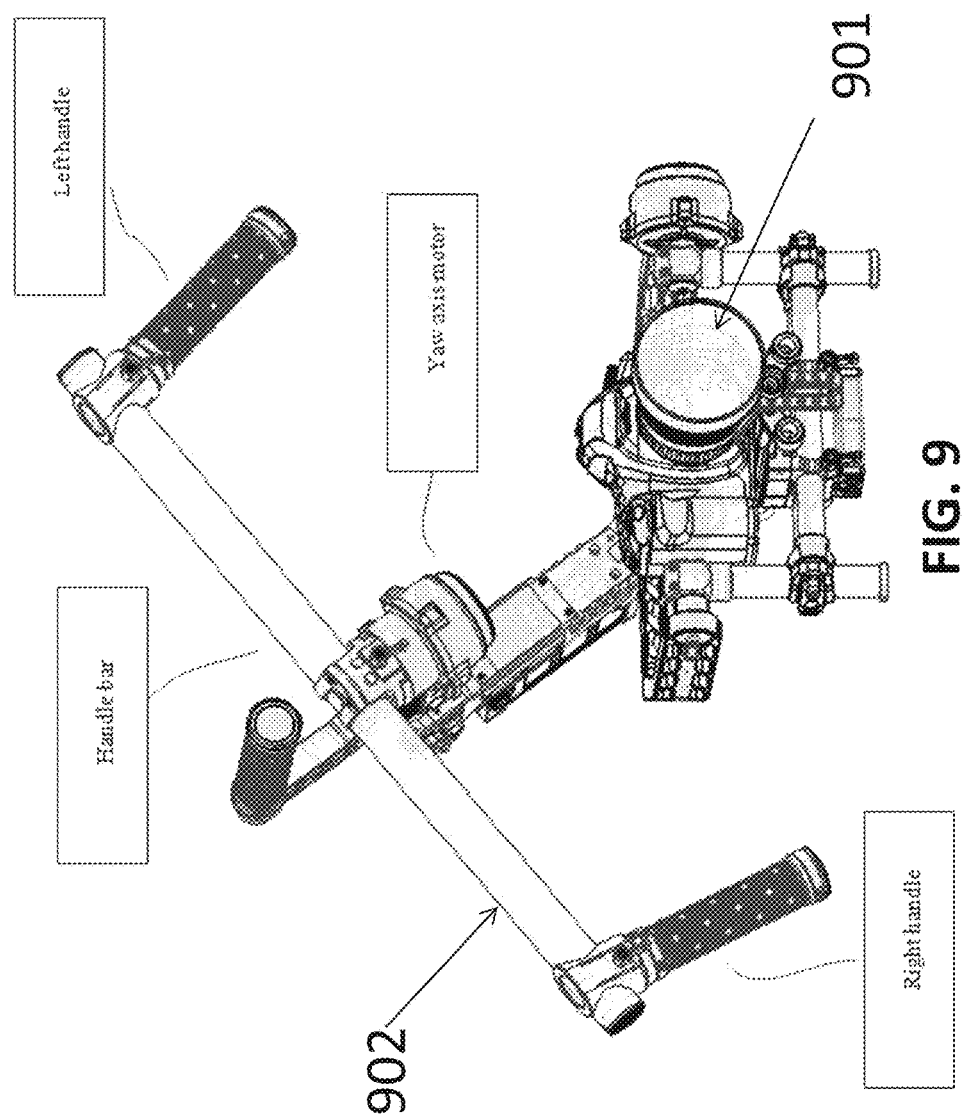
FIG. 9 shows a stabilization platform with a handle assembly transitioning from a horizontal to a vertical orientation.
Figure 10:
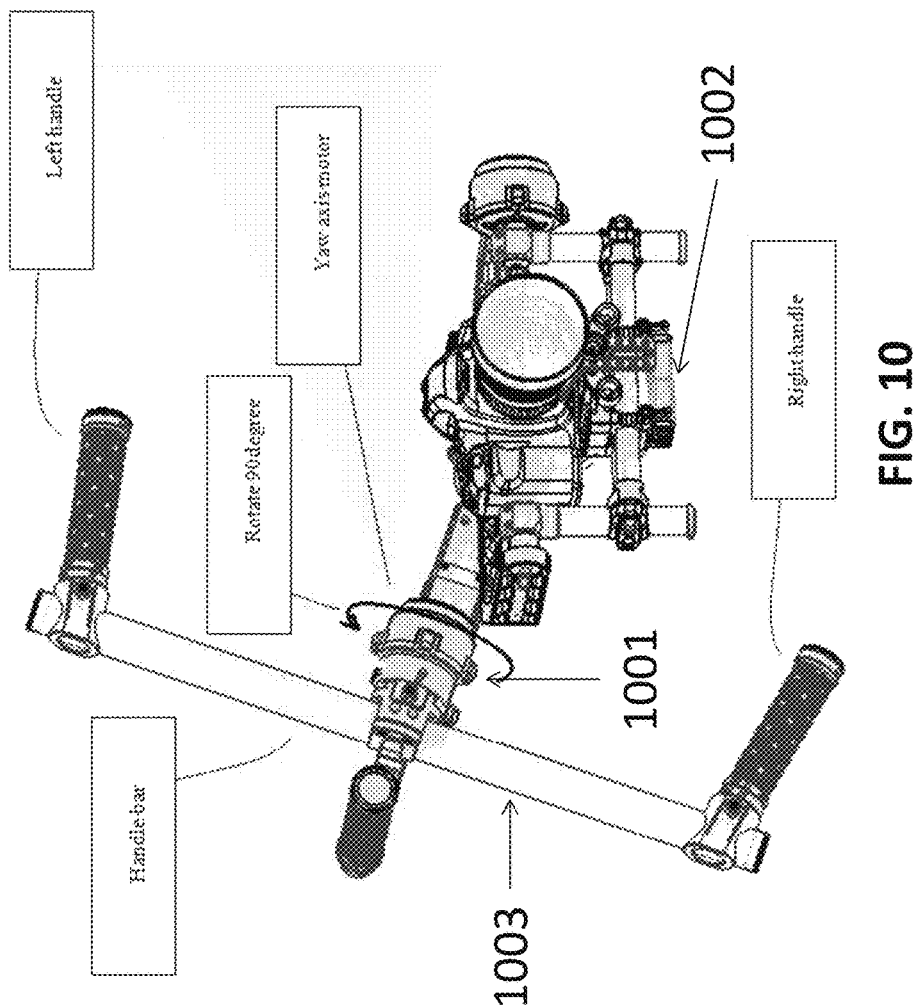
FIG. 10 shows a stabilization platform with a handle assembly further transitioning from a horizontal to a vertical orientation.

The handle may be rotated downward such that it approaches a vertical configuration as shown in FIG. 9. During the continuous movement of the handle bar, one or more intermediate configurations may be provided. The payload may maintain its initial orientation as the handle bar rotates. For instance, a payload 901 may remain substantially level while the handle bar 902 is at an angle. The rotation of the handle bar 1003 may continue as shown in FIG. 10. Once the angle of the handle bar relative to a horizontal plane reaches a predetermined threshold value the system may register a change in mode from a horizontal mode to a vertical mode. The predetermined threshold angle may be at 90°. Alternatively the threshold angle may be least 15°, 20°, 25°, 30°, 35°, 40°, 45°, 50°, 55°, 60°, 65°, 70°, 75°, 80°, 85°, 95°, 100°, 105°, 110°, 115°, 120°, 125°, 130°, 135°, 140°, 145°, 150°, 155°, 160°, 165°, 170°, or 180°. The threshold angle may be a fixed value. For example, when the handle bar is within 5 degrees of being vertically oriented, the system may register the change. Alternatively the threshold angle may be a function of the angular rotation speed or acceleration. The threshold angle may be calculated with aid of a processor. The calculation may occur using the handle bar angular speed and/or acceleration. The calculation may occur using the direction the handle bar is rotating. The threshold angle may be set by the user. The angle of the handle bar relative to the horizontal plane may be sensed by the sensors on board the stabilization platform, for example the inertial sensors, Hall sensors, or any other types of sensors described elsewhere herein. The sensors may be located on the handle assembly, the frame assembly, payload, and/or on one or more of the motors. In some cases, the rotation of the handles may be calculated by an inertial measurement unit (IMU) on the stabilization unit in a real-time. The IMU may be a pan-tilt-zoom (PTZ) inertial measurement unit. The joint angle of each frame joint can be measured by Hall sensors. Hall sensors may be located on the joints. The Hall sensors may be attached to the three motors used to rotate the payload about the yaw, roll, and pitch axes. The rotation of the handles can be reversely determined by calculating a quaternion difference between the rotation of the handle's ends and the joint angles. A processor may determine whether the handle has switched from a horizontal to a vertical mode based on the measured handle rotation.

In the intermediary configurations shown in FIG. 9 and FIG. 10, the first motor 1001 may control rotation about the yaw axis and the second motor may control rotation about the roll axis 1002. When the processor detects a change from a first mode (horizontal) to a second mode (vertical) the processor may instruct the first motor 1001 may undergo a finite rotation. For example the first motor may rotate 90°. Alternatively the motor may rotate at least 15°, 20°, 25°, 30°, 35°, 40°, 45°, 50°, 55°, 60°, 65°, 70°, 75°, 80°, 85°, 95°, 100°, 105°, 110°, 115°, 120°, 125°, 130°, 135°, 140°, 145°, 150°, 155°, 160°, 165°, 170°, or 180°. In addition to rotating the first motor 1001, the processor may also instruct the first 1001 and second 1002 motors to swap functions such that the first motor controls rotation about the roll axis and the second motor controls rotation about the yaw axis.

Figure 11A:
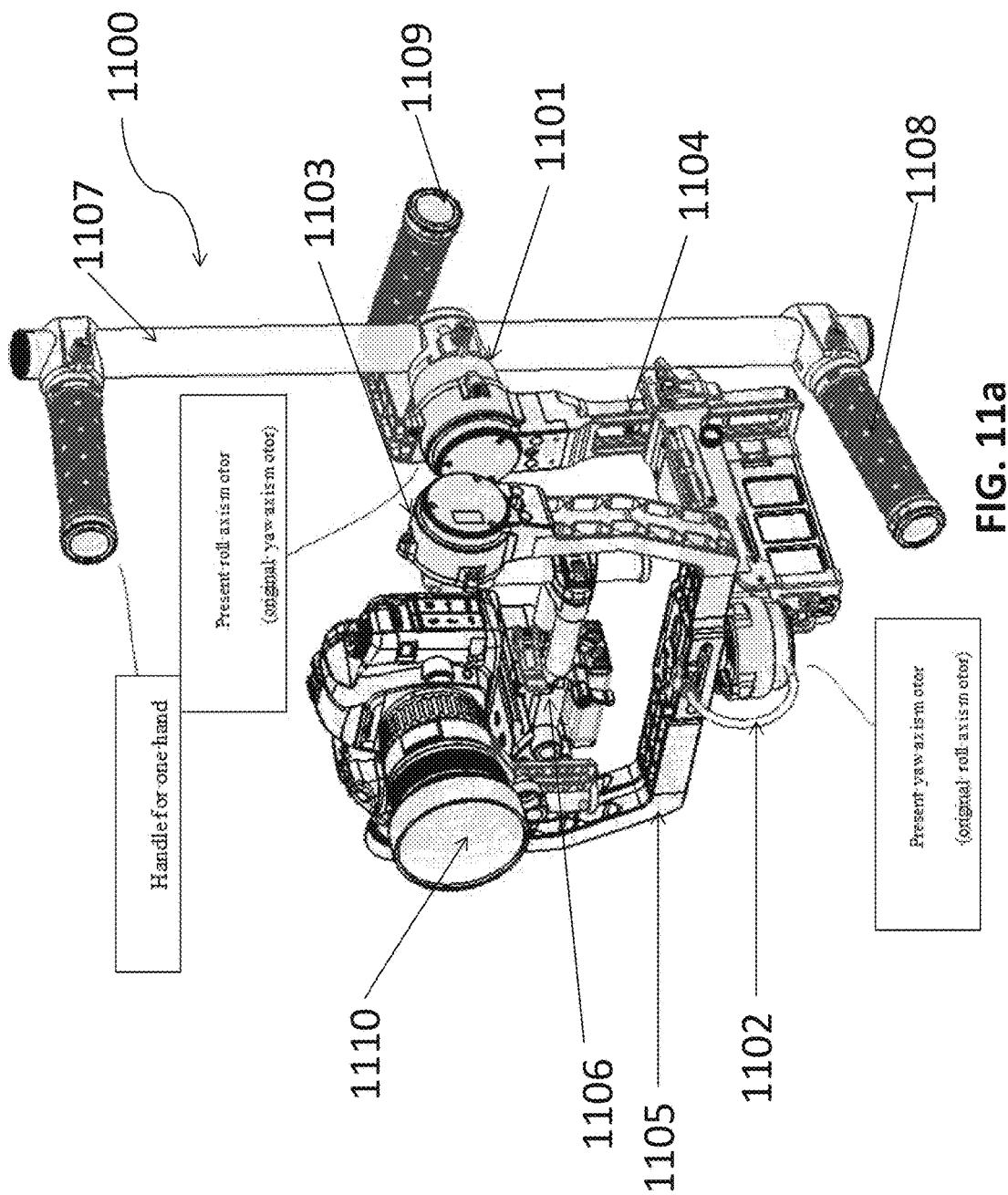
FIG. 11a-b shows a stabilization platform in a vertical orientation.
Figure 11B:
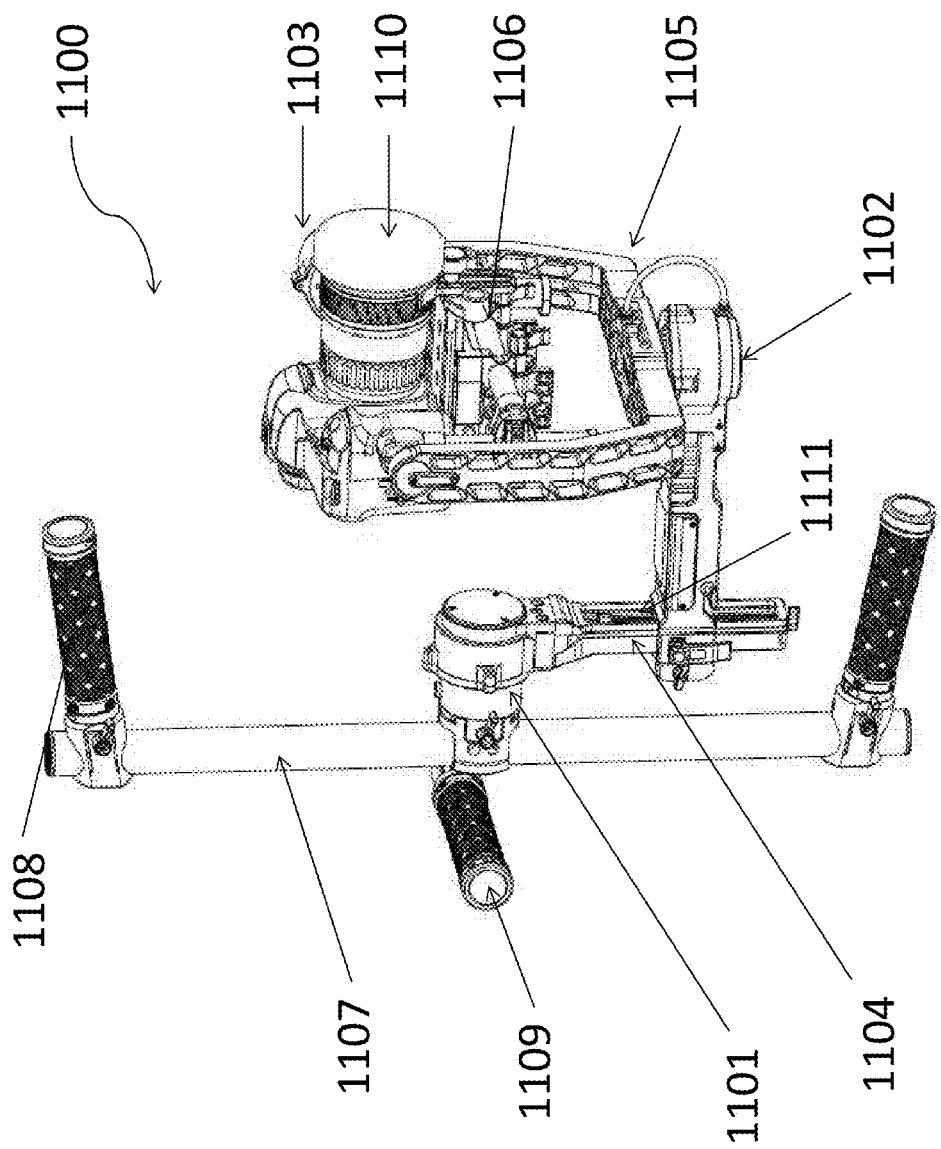

An example of the final result of the handle rotation and the motor rotation may be shown in FIG. 11*a* and FIG. 11*b*.

FIG. 11a and FIG. 11b show the stabilization platform 1100 in a vertical configuration (e.g. briefcase mode). In this mode the first motor 1101 may control rotation about the roll axis and the second 1102 motor may control rotation about the yaw axis. Rotation about the pitch axis may be controlled by the third motor 1103.

This disclosure describes in detail the processes of switching axis control between motors controlling yaw and roll rotation. This description is intended to be exemplary of the features of the stabilization platform rather than limiting. In other embodiments the stabilization platform may be configured to switch motor control in the manner described between any set of motors. In another example, this may include switching control between a pitch and roll motor, a yaw and pitch motor, or a yaw, pitch, and roll motor. Additionally the sequence describes the process of switching from a substantially horizontal configuration to a substantially vertical configuration. The opposite result could be achieved (i.e. from a substantially vertical configuration to a substantially horizontal configuration) by reversing the sequence of motions described.

FIG. 11a provides a view of a stabilization platform 1100 with a handle assembly in a second orientation (e.g., vertical orientation). A first motor 1101, second motor 1102, and third motor 1103 may be provided. A frame assembly may include a first frame component 1104, second frame component 1105, and third frame component 1106. A handle assembly may include a handle bar 1107 connecting a pair of grips 1108. Optionally, a third grip 1109 may be provided. The payload 1110 may be supported by the frame components.

When in the second orientation (e.g., briefcase mode), the first motor 1101 may control roll of the payload, the second motor 1102 may control yaw of the payload, and/or the third motor 1103 may control pitch of the payload. The first frame component 1104 may include a bar that may be substantially parallel to the handle bar when the stabilization platform is in the second orientation. The second motor may be supported by the first frame component. The second frame component 1105 may be driven by the second motor and may move relative to the first frame component about a yaw axis. The third motor may be supported by the second frame component. The third frame component 1106 may be driven by the third motor. The third frame component may support the payload 1110. The payload may be fixed relative to the third frame component. The first motor may be located substantially behind the payload. The second motor may be located substantially beneath the payload. The third motor may be located to the right and/or left of the payload.

FIG. 11b shows an additional view of the stabilization platform in a briefcase mode. Optionally, one or more frame components may include pieces that may be fixed relative to one another or movable relative to one another. In some instances, a first frame component 1104 may include a track 1111 that may enable a piece of the frame component to slide relative to another piece of the frame component. Vertical, horizontal, and/or translational motions may be achieved.

A transition from a horizontal configuration (e.g., FIG. 3) to a vertical configuration (e.g., FIG. 11a, 11b) may result in rotation of a first motor by about 90 degrees to effect rotation of a first frame component. The first frame component 304 may include a bar that may be substantially perpendicular to a horizontal handle bar when the stabilization platform is in the horizontal configuration, and the first frame component 1104 may include a bar that may be substantially parallel to a vertical handle bar 1107 when the stabilization platform is in a vertical configuration. The rotation of the first motor may affect the orientation of the first frame component. The first frame component may include the bar that may be substantially vertical in both the horizontal and vertical configurations. The first frame component may rotate with the handle assembly when the stabilization platform is passing through intermediary configurations (e.g., FIG. 9, FIG. 10), but may rotate when the stabilization platform reaches or nears the vertical configuration.

The second motor 302 may be located behind the payload when the stabilization platform is in the horizontal configuration. The second motor 1102 may be located beneath the payload when the stabilization platform is in the vertical configuration. The orientation of payload relative to one or more grips of the handle assembly may change between the horizontal and vertical configurations. For instance, a payload 308 may face in a direction perpendicular to one or more grips 307 in a horizontal configuration, while the payload 1110 may be facing in a direction parallel to one or more grips 1108 in a vertical configuration. The payload 308 may face in a direction parallel to a third grip in a horizontal configuration, while the payload 1110 may face in a direction perpendicular to a third grip 1109 in a vertical configuration. The second motor may have an axis of rotation parallel to the direction that a payload is facing in a horizontal configuration, while the second motor may have an axis of rotation perpendicular to the direction the payload is facing in a vertical configuration.

A third frame component 306 may include side bars that may be substantially perpendicular to side bars of a second frame component 305 when the stabilization platform is in a horizontal configuration. The third frame component 1106 may include side bars that may be substantially parallel to side bars of a second frame component 1105 when the stabilization platform is in a vertical configuration. The second and third frame components may not be coplanar when the stabilization platform is in a horizontal configuration. The second and third frame components may be coplanar when the stabilization platform is in a vertical configuration. A lateral bar of the third frame component may be beneath the payload when the stabilization platform is in a horizontal configuration and when the stabilization platform is in a vertical configuration.

Any description herein of how components of a stabilization platform may be positioned or oriented, or may change in orientation may apply to when the stabilization platform changes from a horizontal to vertical configuration, or vice versa.

Figure 12:
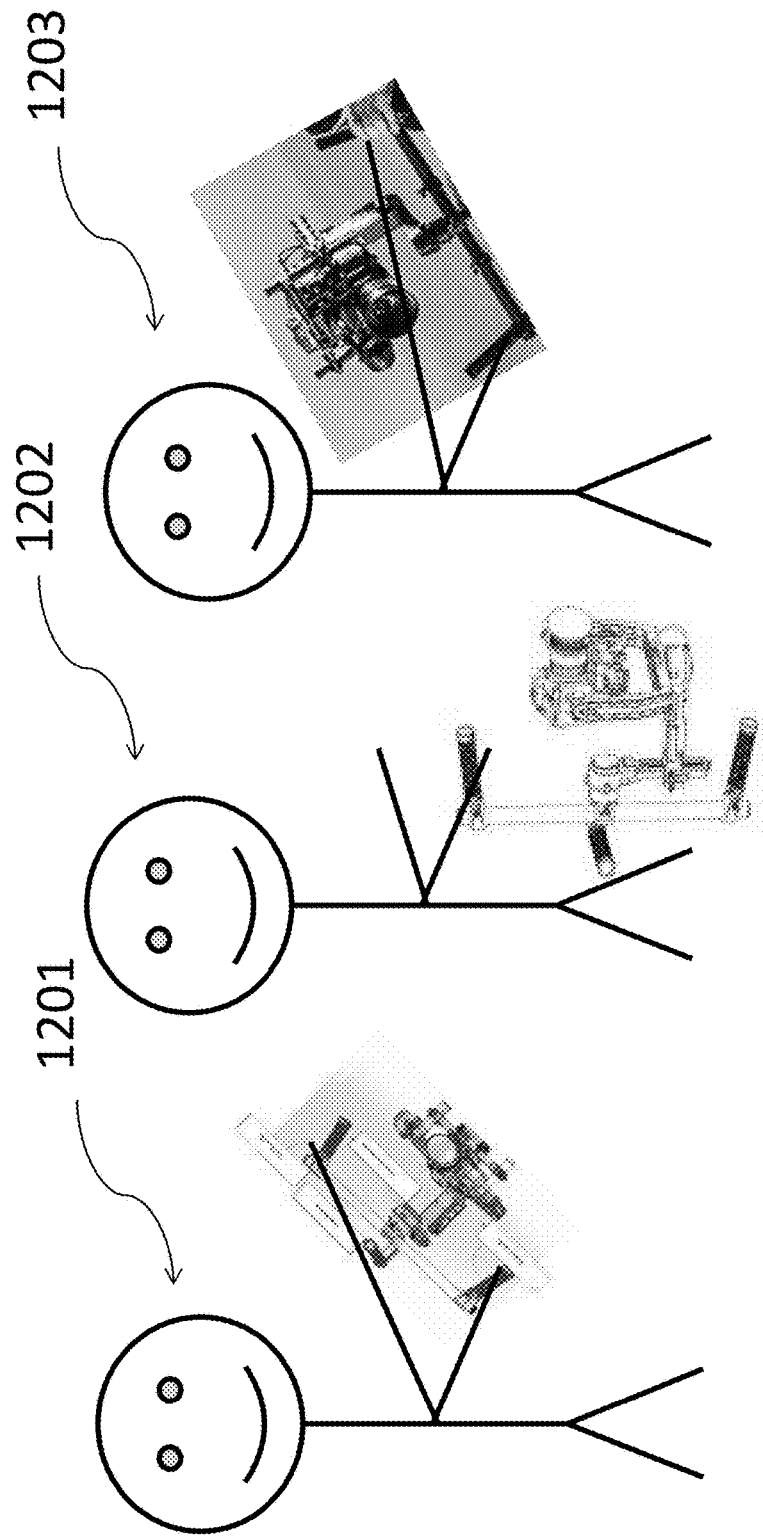
FIG. 12 shows an example of a stabilization platform with a camera as the payload.

An example of a user with the stabilization platform holding a camera is shown in FIG. 12. The three modes may be advantageous when capturing different shot angles. For example the underslung mode 1201 may be used to capture still images or video of features at or below a chest height of a user. Upright mode 1203 may capture still images or video of features at an eye level or above a height of a user. Lastly, the briefcase mode 1202 may decrease the size of the stabilization platform into a compact geometry compared to the upright and underslung modes. The briefcase mode may be chosen in area with limited space to shoot features.

The user may grip one or more of the side grips, or a third central grip. In some examples, a user may grip the side grips with two hands to provide a horizontal orientation for a handle bar (e.g., in underslung or upright modes). A user may grip the third grip in a single hand, which may permit a horizontal orientation for a handle bar. In another example, a user may grip a side grip with one hand and the third central grip with another hand. A user may grip a single side grip to provide a vertical orientation for the handle bar (e.g., in briefcase mode). The user may optionally grip the third central grip in a single hand, which may permit vertical orientation for the handle bar. Optionally, a user may grip any one or two of the grips to provide any orientation for the handle bar.

The user may transition between different modes. The payload may remain operational while the user is transitioning between the different modes. The payload may remain operational while the stabilization platform is in an intermediary mode. For example, if the payload is a camera, the camera may remain powered on and/or recording while the user is transitioning between different modes. The user may change the orientation of a handle assembly, while the payload, such as the camera, may be seamlessly collecting data. The stabilization platform may remain operation while the user is transitioning between different modes. One or more motors and/or processors may be in operation to stabilize a payload while the user is changing the orientation of the handle assembly. Data from sensors may be continuously collected, collected on a periodic basis, or collected in response to an event. The data from the sensors may be used to generate a signal that may control actuation of the motors. Such data collection and control may occur substantially in real-time while the user may be moving the handle assembly. Optionally, a payload may remain stabilized while the handle assembly is moved (e.g., translationally or rotationally). For example, a camera may remain oriented in the same direction and little or no jerkiness or shaking may ensue while the user moves around the handle assembly. The image captured by the camera may remain level.

Figure 13B:
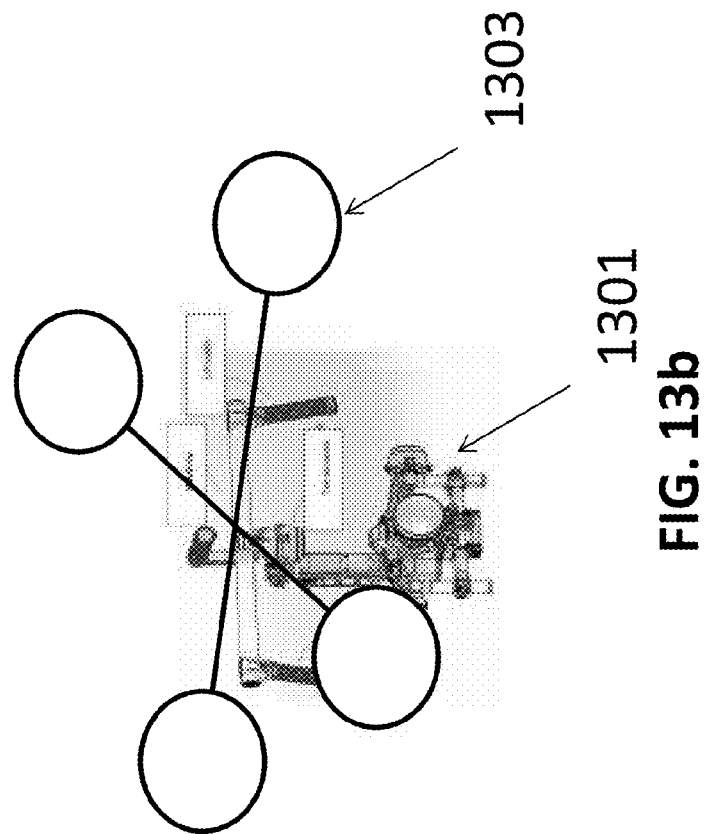
FIG. 13a-b shows examples of stabilization systems mounted on vehicles (e.g. a car and an unmanned aerial vehicle (UAV)).
Figure 13A:
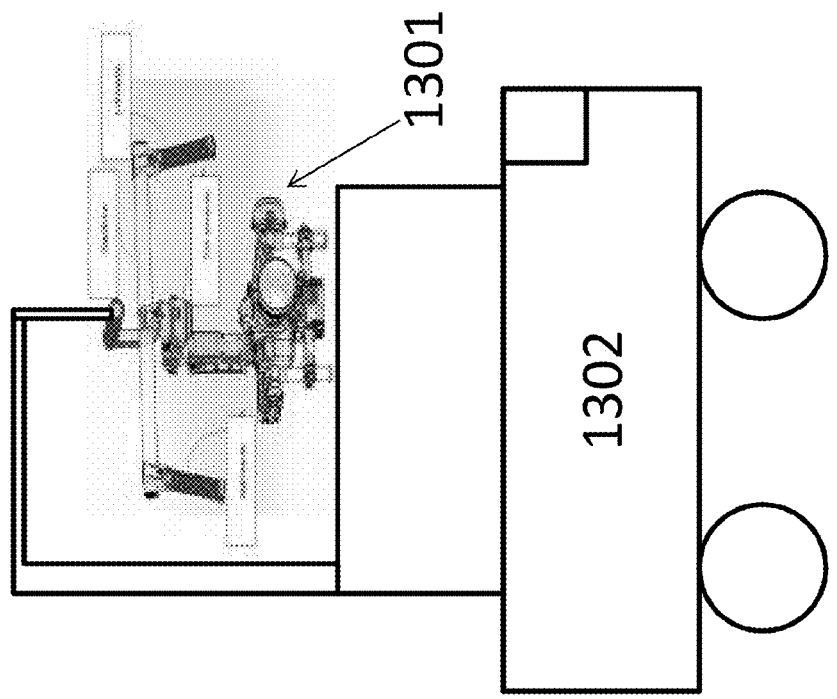

In an alternate case, the stabilization platform may be mounted on an object. The object may be a stationary object, or a movable object, such as a vehicle. When the stabilization platform is mounted on a vehicle, the platform may or may not be held by a human user. Alternatively, the stabilization platform may be mounted to a vehicle or other object using a permanent or temporary attachment. For example, a boom may be provided, from which the stabilization platform may hang. The stabilization platform may be mounted to a front, back, side, top, or bottom of a vehicle. A vehicle may have attachments for a stabilization platform in one or more locations on the vehicle. The stabilization platform may be mounted to the vehicle in a horizontal or vertical configuration. The mounts for the stabilization platform on the vehicle may be configured such that they may rotate or translate to cause the stabilization platform to change from a horizontal to a vertical configuration. The vehicle may be a car, truck, bus, trolley, boat, motorcycle, bike, airplane, jet plane, unmanned aerial vehicle (UAV), a train, or any other type of vehicle as described elsewhere herein. FIGS. 13a and 13b show possible examples of stabilization platforms 1301 mounted to a car 1302 and a UAV 1303.

The payload may be a camera. The camera may be stabilized by the stabilization platform, which may be carried by a stationary or movable object. In some instances, the camera may remain on while the stabilization platform is moved by a movable object. The camera may capture still photos or video while the stabilization platform is stationary or in motion. A user may carry the stabilization in the user's hands and then attach is to an object, such as a boom or movable object. The camera may remain on and collecting image data while the transition from handheld to object-supported is made. The camera may be stabilized so that the image collected remains smooth while the transition is made from being handheld to object-supported. Similarly, the camera may remain on and stabilized while a transition may occur from being object-supported to handheld. The stabilization platform described herein may reduce the likelihood of gimbal lock and may advantageously permit the payload to remain stabilized while a handle assembly orientation and/or position is changed. This may permit smooth video capture while the video capture device is moved around in a handheld or object-supported fashion.

The systems, devices, and methods described herein may include stabilization platform that can be carried by a wide variety of movable objects. Any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects. A human or any other type of movable object described herein may be used to carry or support a stabilization platform.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 14:
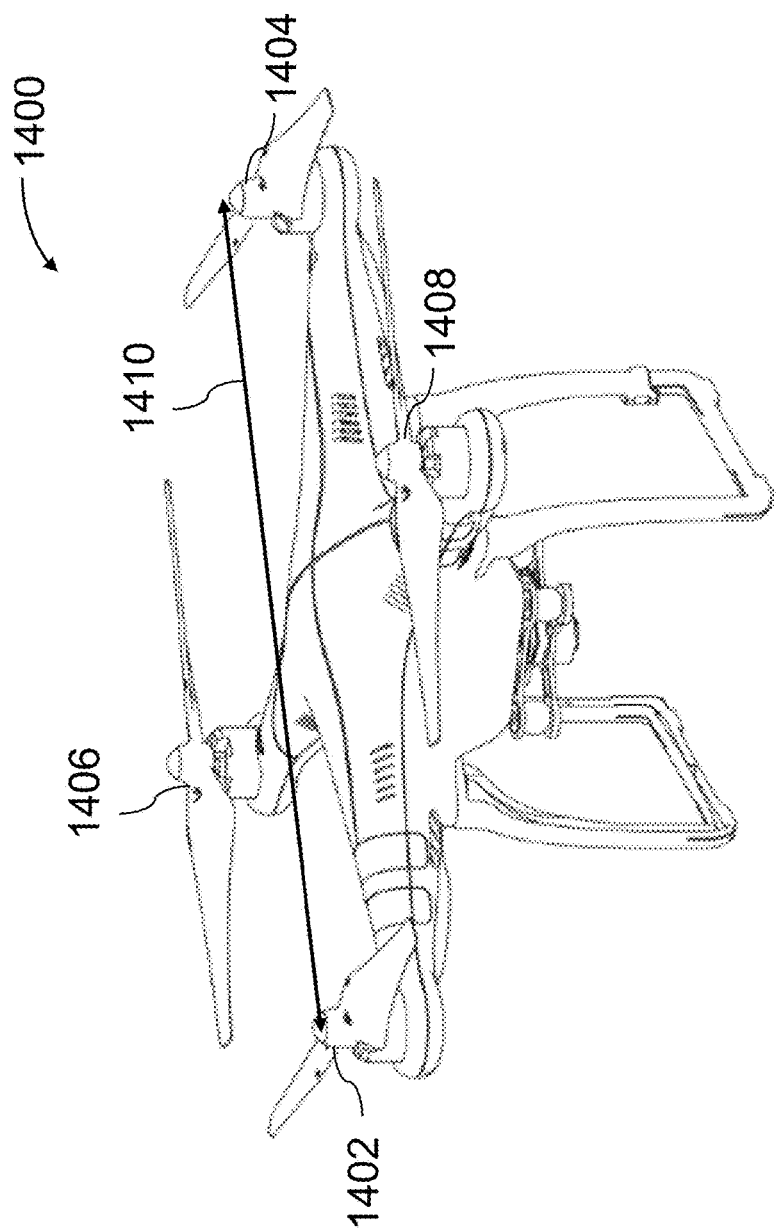
FIG. 14 illustrates a movable object including a carrier and a payload, in accordance with an embodiment of the invention.

FIG. 14 illustrates an unmanned aerial vehicle (UAV) 1400, in accordance with embodiments of the present invention. The UAV may be an example of a movable object as described herein. The UAV 1400 can include a propulsion system having four rotors 1402, 1404, 1406, and 1408. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 1410 can be less than or equal to 2 m, or less than equal to 5 m. In some embodiments, the length 1410 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
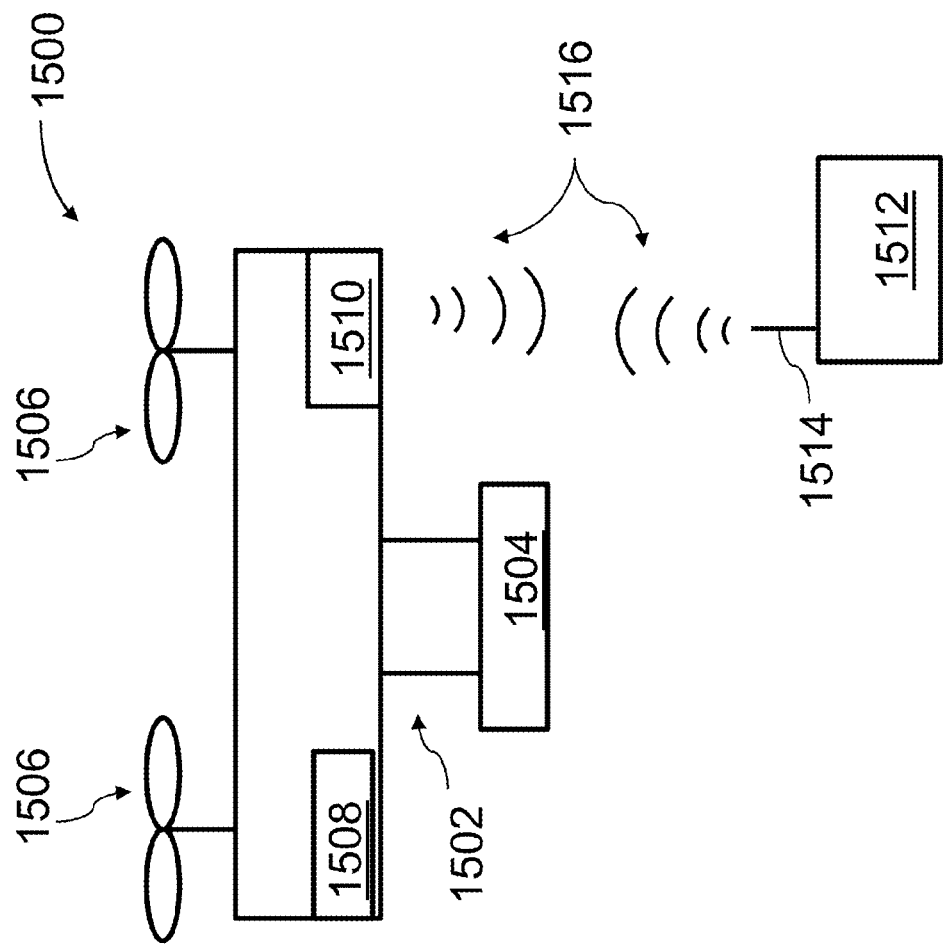
FIG. 15 is a schematic illustration by way of block diagram of a system for controlling a movable object, in accordance with an embodiment of the invention.

FIG. 15 illustrates a movable object 1500 including a carrier 1502 and a payload 1504, in accordance with embodiments. Although the movable object 1500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1504 may be provided on the movable object 1500 without requiring the carrier 1502. The movable object 1500 may include propulsion mechanisms 1906, a sensing system 1508, and a communication system 1510.

The propulsion mechanisms 1506 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1506 can be mounted on the movable object 1500 using any suitable means, such as a support element (e.g., a drive shaft) as described elsewhere herein. The propulsion mechanisms 1506 can be mounted on any suitable portion of the movable object 1500, such on the top, bottom, front, back, sides, or suitable combinations thereof.

In some embodiments, the propulsion mechanisms 1506 can enable the movable object 1500 to take off vertically from a surface or land vertically on a surface without requiring any horizontal movement of the movable object 1500 (e.g., without traveling down a runway). Optionally, the propulsion mechanisms 1506 can be operable to permit the movable object 1500 to hover in the air at a specified position and/or orientation. One or more of the propulsion mechanisms 1500 may be controlled independently of the other propulsion mechanisms. Alternatively, the propulsion mechanisms 1500 can be configured to be controlled simultaneously. For example, the movable object 1500 can have multiple horizontally oriented rotors that can provide lift and/or thrust to the movable object. The multiple horizontally oriented rotors can be actuated to provide vertical takeoff, vertical landing, and hovering capabilities to the movable object 1500. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1500 (e.g., with respect to up to three degrees of translation and up to three degrees of rotation).

The sensing system 1508 can include one or more sensors that may sense the spatial disposition, velocity, and/or acceleration of the movable object 1500 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1508 can be used to control the spatial disposition, velocity, and/or orientation of the movable object 1500 (e.g., using a suitable processing unit and/or control module, as described below). Alternatively, the sensing system 1508 can be used to provide data regarding the environment surrounding the movable object, such as weather conditions, proximity to potential obstacles, location of geographical features, location of manmade structures, and the like.

The communication system 1510 enables communication with terminal 1512 having a communication system 1514 via wireless signals 1516. The communication systems 1510, 1514 may include any number of transmitters, receivers, and/or transceivers suitable for wireless communication. The communication may be one-way communication, such that data can be transmitted in only one direction. For example, one-way communication may involve only the movable object 1500 transmitting data to the terminal 1512, or vice-versa. The data may be transmitted from one or more transmitters of the communication system 1510 to one or more receivers of the communication system 1512, or vice-versa. Alternatively, the communication may be two-way communication, such that data can be transmitted in both directions between the movable object 1500 and the terminal 1512. The two-way communication can involve transmitting data from one or more transmitters of the communication system 1510 to one or more receivers of the communication system 1514, and vice-versa.

In some embodiments, the terminal 1512 can provide control data to one or more of the movable object 1500, carrier 1502, and payload 1504 and receive information from one or more of the movable object 1500, carrier 1502, and payload 1504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1506), or a movement of the payload with respect to the movable object (e.g., via control of the carrier 1502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1508 or of the payload 1504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1512 can be configured to control a state of one or more of the movable object 1500, carrier 1502, or payload 1504. Alternatively or in combination, the carrier 1502 and payload 1504 can also each include a communication module configured to communicate with terminal 1512, such that the terminal can communicate with and control each of the movable object 1500, carrier 1502, and payload 1504 independently.

In some embodiments, the movable object 1500 can be configured to communicate with another remote device in addition to the terminal 1512, or instead of the terminal 1512. The terminal 1512 may also be configured to communicate with another remote device as well as the movable object 1500. For example, the movable object 1500 and/or terminal 1512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1500, receive data from the movable object 1900, transmit data to the terminal 1512, and/or receive data from the terminal 1512. Optionally, the remote device can be connected to the Internet or other telecommunications network, such that data received from the movable object 1500 and/or terminal 1512 can be uploaded to a website or server.

Figure 16:
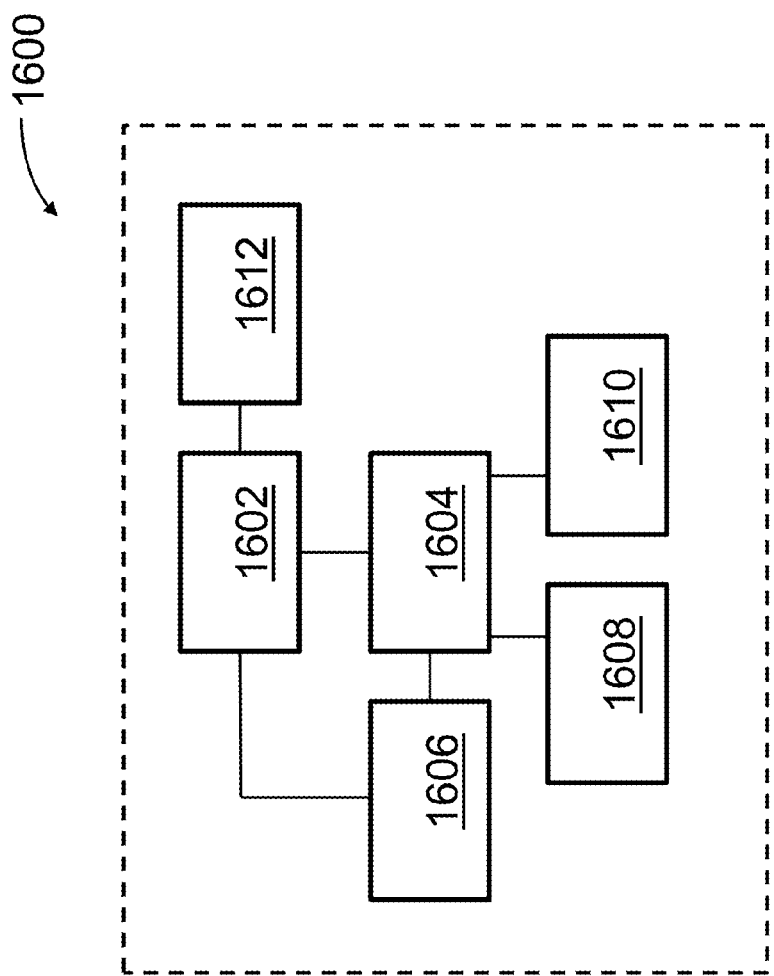
FIG. 16 shows an example of a landing process for a multi-zone battery station in accordance with an embodiment of the invention.

FIG. 16 is a schematic illustration by way of block diagram of a system 1600 for controlling a movable object, in accordance with embodiments. The system 1600 can be used in combination with any suitable embodiment of the systems, devices, and methods disclosed herein. The system 1600 can include a sensing module 1602, processing unit 1604, non-transitory computer readable medium 1606, control module 1608, and communication module 1610.

The sensing module 1602 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1602 can be operatively coupled to a processing unit 1604 having a plurality of processors. In some embodiments, the sensing module can be operatively coupled to a transmission module 1612 (e.g., a Wi-Fi image transmission module) configured to directly transmit sensing data to a suitable external device or system. For example, the transmission module 1612 can be used to transmit images captured by a camera of the sensing module 1602 to a remote terminal.

The processing unit 1604 can have one or more processors, such as a programmable processor (e.g., a central processing unit (CPU)). The processing unit 1604 can be operatively coupled to a non-transitory computer readable medium 1606. The non-transitory computer readable medium 1606 can store logic, code, and/or program instructions executable by the processing unit 1604 for performing one or more steps. The non-transitory computer readable medium can include one or more memory units (e.g., removable media or external storage such as an SD card or random access memory (RAM)). In some embodiments, data from the sensing module 1602 can be directly conveyed to and stored within the memory units of the non-transitory computer readable medium 1606. The memory units of the non-transitory computer readable medium 1606 can store logic, code and/or program instructions executable by the processing unit 1604 to perform any suitable embodiment of the methods described herein. For example, the processing unit 1604 can be configured to execute instructions causing one or more processors of the processing unit 1604 to analyze sensing data produced by the sensing module. The memory units can store sensing data from the sensing module to be processed by the processing unit 1604. In some embodiments, the memory units of the non-transitory computer readable medium 1606 can be used to store the processing results produced by the processing unit 1604.

In some embodiments, the processing unit 1604 can be operatively coupled to a control module 1608 configured to control a state of the movable object. For example, the control module 1608 can be configured to control the propulsion mechanisms of the movable object to adjust the spatial disposition, velocity, and/or acceleration of the movable object with respect to six degrees of freedom. Alternatively or in combination, the control module 1608 can control one or more of a state of a carrier, payload, or sensing module.

The processing unit 1604 can be operatively coupled to a communication module 1610 configured to transmit and/or receive data from one or more external devices (e.g., a terminal, display device, or other remote controller). Any suitable means of communication can be used, such as wired communication or wireless communication. For example, the communication module 1610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1610 can transmit and/or receive one or more of sensing data from the sensing module 1602, processing results produced by the processing unit 1604, predetermined control data, user commands from a terminal or remote controller, and the like.

The components of the system 1600 can be arranged in any suitable configuration. For example, one or more of the components of the system 1600 can be located on the movable object, carrier, payload, terminal, sensing system, or an additional external device in communication with one or more of the above. Additionally, although FIG. 16 depicts a single processing unit 1604 and a single non-transitory computer readable medium 1606, one of skill in the art would appreciate that this is not intended to be limiting, and that the system 1600 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1600 can occur at one or more of the aforementioned locations.

Any description herein of a carrier may apply to the stabilization platform as described or any other type of carrier.

Optionally, a stabilization platform may be controlled by a single operator. The single operator may move the handle assembly (e.g., carry the handle assembly) or cause the handle assembly to be moved about (e.g., control movement of a movable object that may carry the stabilization platform). The single operator may or may not control the orientation of the payload. In some instances, absent instructions from the operator, the payload may remain at the same orientation while the handle assembly is moved about. Alternatively, the payload may alter orientation in response to instructions from a processor. In other instances, the operator may provide input that may control the orientation of the payload. For example, the operator may instruct the payload to change orientation about a yaw, pitch, and/or roll axis with respect to a fixed reference frame.

In some instances, the stabilization platform may be controlled by two or more operators. For example, a first operator may move the handle assembly or cause the handle assembly to move about. A second operator may or may not control orientation of the payload. The second operator may have a remote control that may communicate with the stabilization platform. The remote control may accept inputs from the second operator and transmit instructions to the stabilization platform that may control movement of the payload. For example, the instructions may cause the payload to rotate about a yaw, roll, and/or pitch axis with respect to a fixed reference frame. In other instances, the instructions may control other functions of the payload. For example, if the payload is a camera, the instructions may permit the camera to be remotely turned on or off, zoom in or zoom out, light balance controls, shutter speed control, shooting mode control, or any other type of control of camera functions. The remote control may transmit the signals wirelessly to the stabilization platform. A processor on-board or in communication with the stabilization platform may receive the signals from the remote control and may generate a signal that may be transmitted to the motors of the stabilization platform. The motors may be actuated in response to the generated signal and may cause the payload to respond to the instructions from the remote control.

Figure 17:
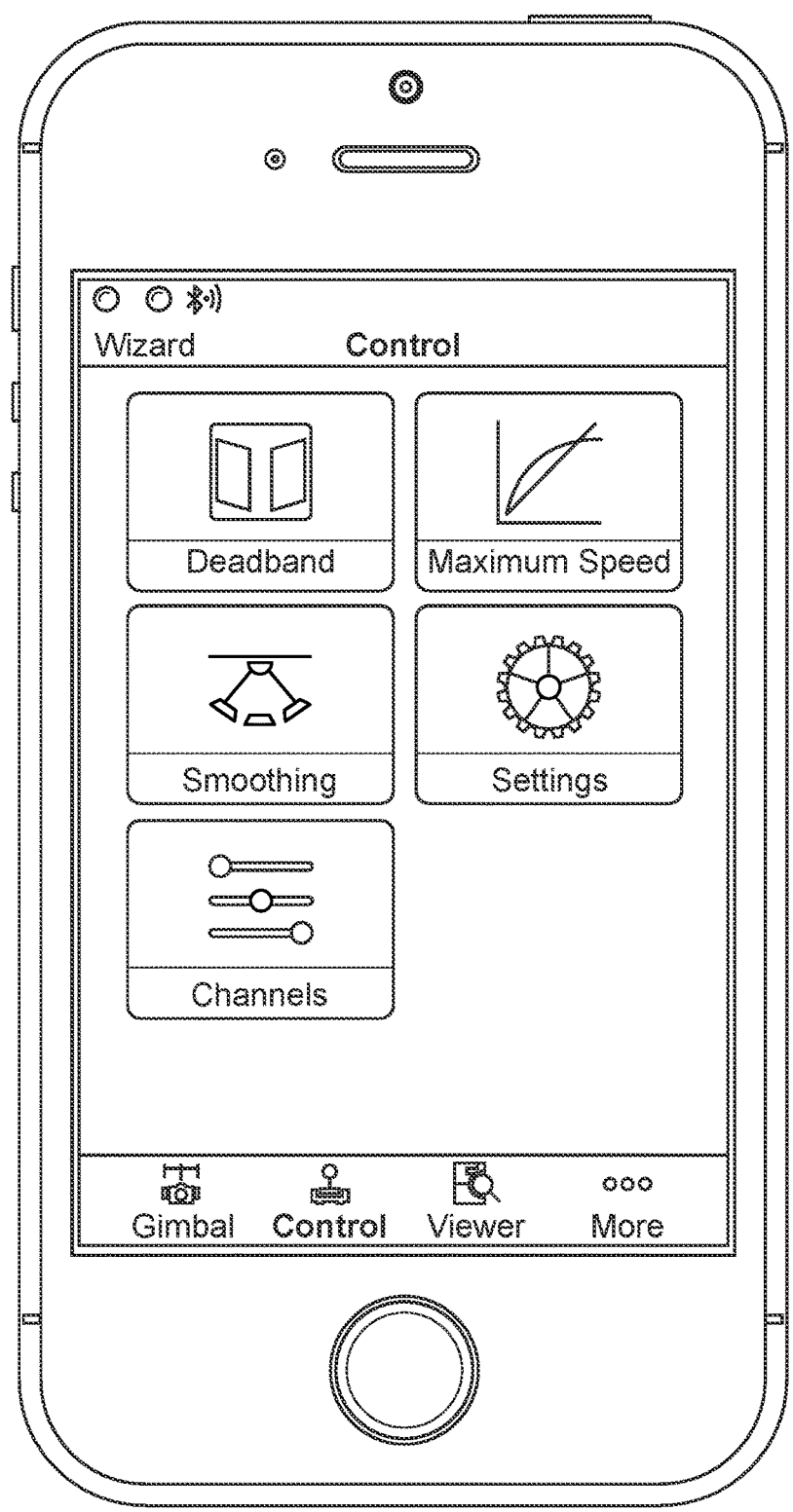
FIG. 17 shows an example of a remote device that may be used to control an aspect or setting of a stabilization platform in accordance with an embodiment of the invention.

Any type of device may be used as a remote controller to control any aspect of the stabilization platform. In some instances, the remote controller, or another device may be used to set up one or more functions of the stabilization platform. In some instances, functions such as deadband, maximum speed, smoothing, settings, or channels may be determined with aid of an external device. FIG. 17 shows an example of a remote device that may be used to control an aspect or setting of the stabilization platform. In some instances, the remote controller or set-up device may be a mobile device, such as a smartphone, tablet, laptop, personal digital assistant, wearable device (e.g., glasses, wristband, arm band, gloves, torso band, helmet, pendant), or any other type of mobile device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A stabilizing platform configured to stabilize a payload comprising:
   a frame assembly comprising a plurality of frame components movable relative to one another, said frame assembly configured to support the payload;
   a handle assembly that bears weight of the frame assembly and is configured to be switchable between a first orientation and a second orientation independently of an orientation of the payload, wherein the handle assembly comprises a handle bar connecting two grips, wherein the frame assembly is supported on the handle bar, and wherein the handle bar has (i) a substantially horizontal orientation when the handle assembly is in the first orientation, and (ii) a substantially vertical orientation when the handle assembly is in the second orientation; and
   a plurality of motors configured to permit the frame components to move relative to one another to keep the orientation of the payload independent of switching of the handle assembly between the first orientation and the second orientation.

2. The stabilizing platform of claim 1, wherein the stabilizing platform has a greater width when the handle assembly is in the first orientation than when the handle assembly is in the second orientation.

3. The stabilizing platform of claim 1, wherein the payload is located laterally between the two grips when the handle assembly is in the first orientation.

4. The stabilizing platform of claim 3, wherein the payload is located at a greater height than the two grips.

5. The stabilizing platform of claim 3, wherein the payload is located at a lesser height than the two grips.

6. The stabilizing platform of claim 1, wherein the payload is located at a height between the two grips when the handle assembly is in the second orientation.

7. The stabilizing platform of claim 6, wherein the payload is laterally aligned with the two grips.

8. The stabilizing platform of claim 1, wherein a center of mass of a combination of the payload and the frame assembly is beneath the handle bar when the handle assembly is in the first orientation.

9. The stabilizing platform of claim 1, wherein a center of mass of a combination of the payload and the frame assembly is above the handle bar when the handle assembly is in the first orientation.

10. The stabilizing platform of claim 1, wherein a center of mass of a combination of the payload and the frame assembly is between the two grips when the handle assembly is in the second orientation.

11. The stabilizing platform of claim 1, wherein the plurality of motors comprise a first motor that is configured to (a) control movement of the payload about a yaw axis when the handle assembly is in the first orientation, and (b) control movement of payload about a roll axis when the handle assembly is in the second orientation.

12. The stabilizing platform of claim 11, wherein the plurality of motors comprise a second motor that is configured to (a) control movement of the payload about the roll axis when the handle assembly is in the first orientation, and (b) control movement of the payload about the yaw axis when the handle assembly is in the second orientation.

13. The stabilizing platform of claim 11, wherein the first motor is configured to rotate by a predetermined number of degrees when the handle assembly changes from the first orientation to the second orientation.

14. The stabilizing platform of claim 1, wherein the handle assembly further comprises a third grip extending from the handle bar between the two grips.

15. The stabilizing platform of claim 14, wherein the third grip is aligned substantially perpendicularly to the two grips.

16. The stabilizing platform of claim 1, wherein the payload is a camera.

17. A method of stabilizing a platform, said method comprising:
providing a frame assembly comprising a plurality of frame components movable relative to one another, said frame assembly configured to support the payload;
bearing weight of the frame assembly using a handle assembly that is configured to be switchable between a first orientation and a second orientation independently of an orientation of the payload, wherein the handle assembly comprises a handle bar connecting two grips, wherein the frame assembly is supported on the handle bar, and wherein the handle bar has (i) a substantially horizontal orientation when the handle assembly is in the first orientation, and (ii) a substantially vertical orientation when the handle assembly is in the second orientation; and
providing a plurality of motors configured to permit the frame components to move relative to one another to keep the orientation of the payload independent of switching of the handle assembly between the first orientation and the second orientation.

18. The method of claim 17, wherein the handle assembly is switched between the first orientation and the second orientation without altering a power state of the plurality of motors.

19. The method of claim 17, wherein the payload is located laterally between the two grips when the handle assembly is in the first orientation.

20. The method of claim 17, wherein the payload is located at a height between the two grips when the handle assembly is in the second orientation.

* * * * *